(12) United States Patent
Sasaki et al.

(10) Patent No.: US 8,898,347 B2
(45) Date of Patent: Nov. 25, 2014

(54) REPEATER DEVICE AND CONTROL METHOD

(75) Inventors: Takashi Sasaki, Tokyo (JP); Satoshi Higuchi, Kanagawa (JP); Keisuke Satou, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 13/154,955

(22) Filed: Jun. 7, 2011

(65) Prior Publication Data

US 2012/0023267 A1    Jan. 26, 2012

(30) Foreign Application Priority Data

Jul. 23, 2010    (JP) ................................ 2010-166325

(51) Int. Cl.
    *G06F 3/00*        (2006.01)
    *G06F 5/00*        (2006.01)
    *H04N 21/4363*     (2011.01)
    *H04N 5/765*       (2006.01)

(52) U.S. Cl.
    CPC ......... *H04N 5/765* (2013.01); *H04N 21/43635* (2013.01); *G09G 2330/021* (2013.01); *G09G 2370/12* (2013.01); *G09G 2370/06* (2013.01)
    USPC ............................................. 710/14; 710/36

(58) Field of Classification Search
    USPC .................................................. 710/14, 36
    See application file for complete search history.

(56) References Cited

U.S. PATENT DOCUMENTS

| 2008/0297660 | A1* | 12/2008 | Shioya ......................... 348/705 |
| 2009/0244391 | A1* | 10/2009 | Kitami et al. ................ 348/705 |
| 2010/0066919 | A1* | 3/2010 | Nakajima et al. ............ 348/734 |
| 2011/0066759 | A1* | 3/2011 | Kikkawa et al. ................. 710/3 |

FOREIGN PATENT DOCUMENTS

| JP | 2001-111740 | 4/2001 |
| JP | 2002-354351 | 12/2002 |
| JP | 2008-283469 | 11/2008 |
| JP | 2009-260679 | 11/2009 |
| JP | 2010-130068 | 6/2010 |

* cited by examiner

*Primary Examiner* — Zachary K Huson
(74) *Attorney, Agent, or Firm* — Sony Corporation

(57) ABSTRACT

A repeater device connected to source and sink devices includes: an input terminal receiving transmission data supplied from the source device; relay means for relaying the transmission data; an output terminal outputting the transmission data relayed by the relay means to the sink device; control means for setting an operating mode of a limited state where a dynamic function of causing a superficial dynamic change and allowing a user to visually confirm the superficial dynamic change is deactivated and only a static function of not causing the superficial dynamic change is activated in response to a user's predetermined operation even when the source and sink device are connected to each other in a controllable state; and switch means for switching activated and deactivated states of a connecting line to the sink device by controlling the ON and OFF states.

23 Claims, 18 Drawing Sheets

FIG.2

CEC TABLE SHOWING CORRELATION BETWEEN
DEVICES AND CEC LOGICAL ADDRESSES

TL

| LOGICAL ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS) BROADCAST (AS DESTINATION ADDRESS) |

CONFIGURATION OF AV AMPLIFIER

FIG.9

PIN ARRANGEMENT OF HDMI TERMINALS

| PIN | SIGNAL ASSIGNMENT |
|---|---|
| 1 | TMDS DATA2+ |
| 3 | TMDS DATA2- |
| 5 | TMDS DATA1 SHIELD |
| 7 | TMDS DATA0+ |
| 9 | TMDS DATA0- |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1- |
| 8 | TMDS DATA0 SHIELD |
| 10 | TMDS CLOCK+ |
| 12 | TMDS CLOCK- |
| 14 | RESERVED(N.C. ON DEVICE) |
| 16 | SDA |
| 18 | +5V POWER |

CEC DATA STRUCTURE

DATA STRUCTURE OF HEADER BLOCK

CONTROL SEQUENCE WHEN AC-OFF STATE IS CHANGED TO POWER-ON STATE ON THE ASSUMPTION OF CEC LIMITED STATUS

CONTROL SEQUENCE WHEN CEC LIMITED STATUS IS SWITCHED TO CEC COMBINED STATUS IN POWER-ON STATE

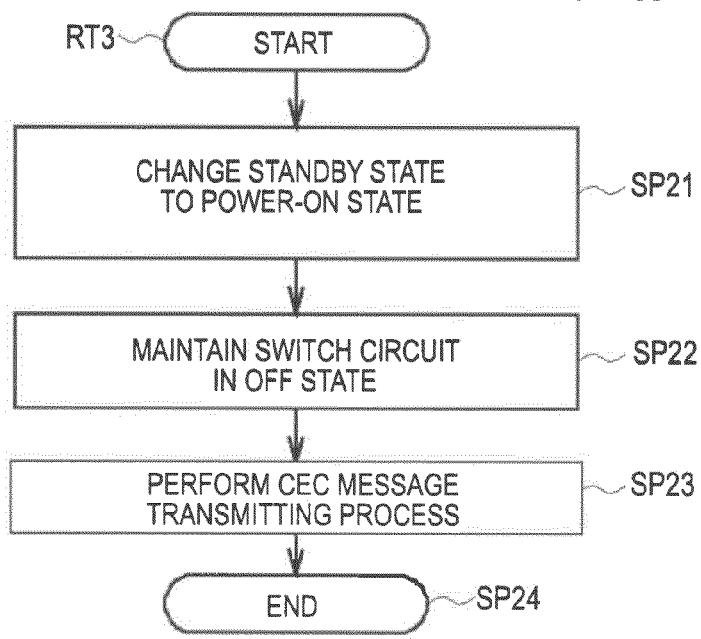
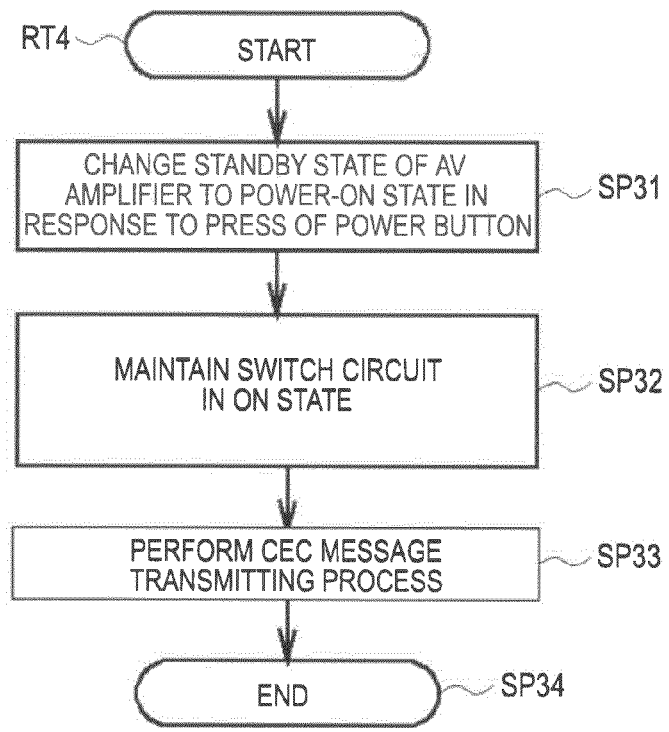

CONTROL SEQUENCE WHEN CEC COMBINED STATUS IS SWITCHED TO CEC LIMITED STATUS IN POWER-ON STATE

CONTROL SEQUENCE WHEN AC-OFF STATE IS CHANGED TO POWER-ON STATE ON THE ASSUMPTION OF CEC COMBINED STATUS

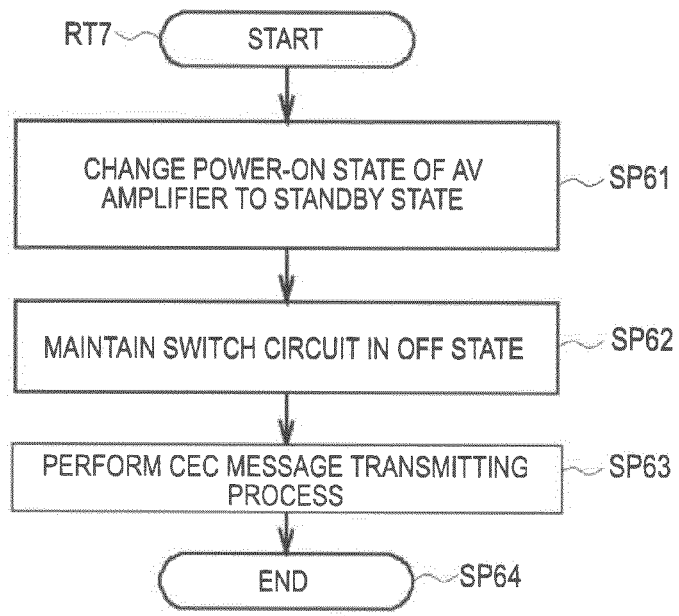
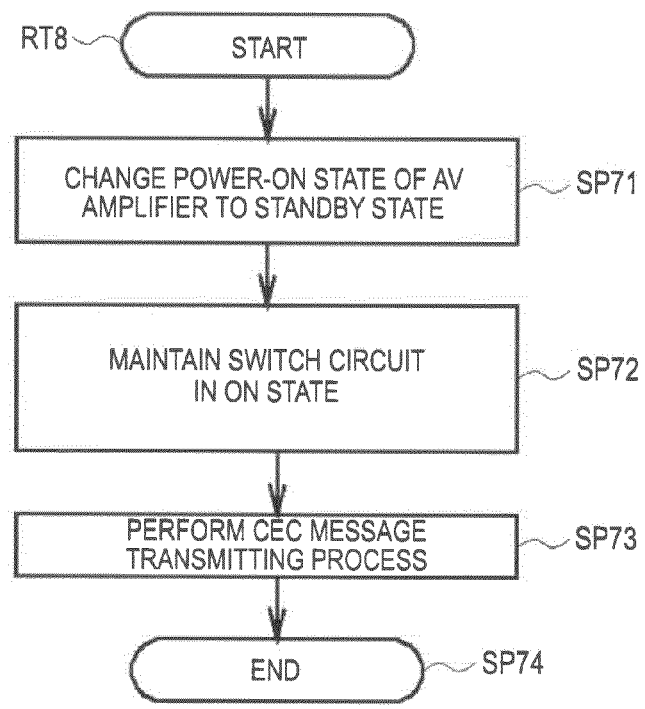

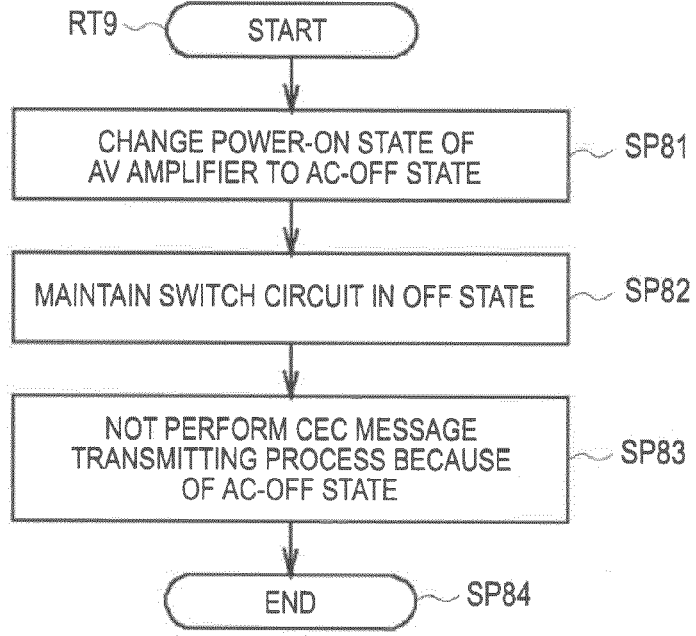
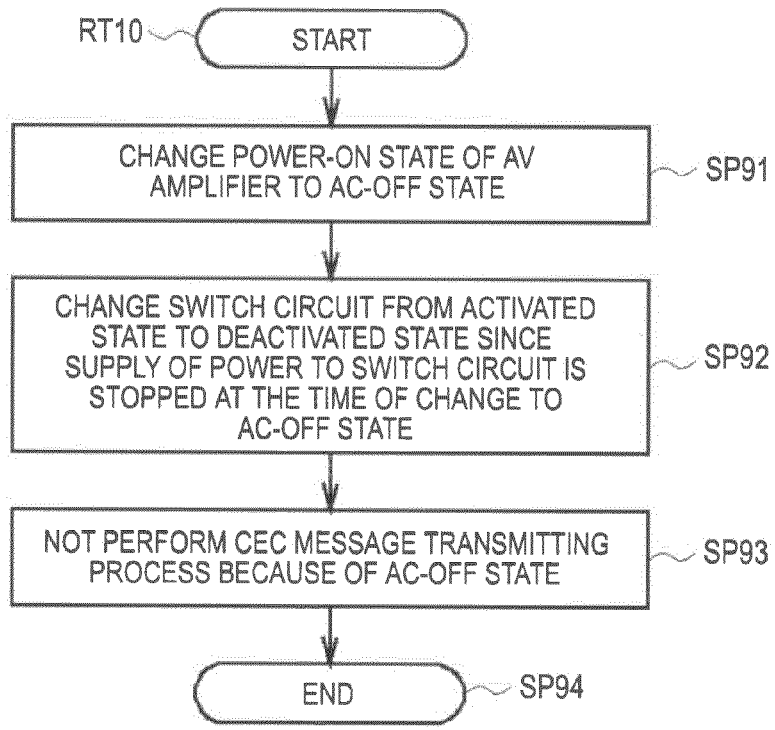

REPEATER DEVICE AND CONTROL METHOD

FIELD

The present disclosure relates to a repeater device and a control method, and more particularly, to a technique which can be suitably applied for controlling a variety of functions in an HDMI (High Definition Multimedia Interface)-CEC (Consumer Electronics Control) compatible device.

BACKGROUND

An HDMI has become popular as a digital interface for the transmission of video and audio. In this HDMI, an audio transmission function or a copyright protection function is added to a DVI (Digital Visual Interface) which is a connection standard between a PC (Personal Computer) and a display and the resultant configuration is arranged for an AV (Audio Visual) device.

In the HDMI standard, inter-device control using a CEC is defined. According to this CEC, a variety of functions can be controlled on the basis of unique physical addresses and logical addresses which can be allocated to devices existing in an HDMI network.

For example, when a DVD player HDMI-connected to a television receiver starts its reproduction while a user is viewing digital broadcasting with the television receiver, the television receiver is automatically switched to an input state where the DVD player is connected to the television receiver so as to perform a CEC combination operation (For example, JP-A-2010-130068).

Accordingly, as a basic function of the CEC, there is an advantage that the user can switch the operating mode to a state where the user can view a video and an audio reproduced by the DVD player by only pressing a playback button of the DVD player without performing an input switching operation on the television receiver. In addition, the user can also operate the menu displayed by the DVD player or ON and OFF states of a power supply by the use of a remote controller of the television receiver.

In the HDMI standard, a CEC message (<Active Source>) indicating an output device which displays a video on the television receiver is defined. Actually, when the user operates a playback button of the DVD player coping with the HDMI standard and the DVD player is in a state where it can output a video signal (that is, in an active state), the DVD player outputs an AV stream and broadcasts the CEC message (<Active Source>) indicating that it is an active device.

Here, the broadcasting means simultaneous transmission of signals to all devices, not to a specific device, as a destination. The television receiver and the other external devices to which the CEC message (<Active Source>) is broadcast from the DVD player switch a path for reproducing the AV stream output from the DVD player.

In this way, the HDMI standard defines that a device (the DVD player in this case) displaying a video on the television receiver broadcasts the CEC message (<Active Source>) to the other devices in the network. In addition, the CEC message (<Active Source>) is one of the CEC messages defined in the HDMI standard.

SUMMARY

However, a CEC combination function between the devices HDMI-connected to each other may cause inconvenience to the user in some cases.

For example, in an AV system in which a CD (Compact Disc) player and a television receiver are HDMI-connected to an AV (Audio Visual) amplifier, it is assumed that only an audio output line is drawn out from the AV amplifier installed in a living room to a different room and a user enjoys the reproduced sound of a the CD player installed in the living room via a speaker installed in the different room.

When the user in the different room wirelessly transmits a play command to the CD player installed in the living room by the use of the remote controller of the CD player, the AV system performs the CEC combination function and the input of the television receiver is automatically switched.

Since the input of the television receiver is automatically switched, there is a problem in that the reaction to the input is meaningless and inconvenient to a user viewing a video of the television receiver in the living room.

Thus, it is desirable to provide a repeater device and a control method, which can allow a combination function between devices connected to each other in a combinable state to work without any inconvenience to a user.

According to an embodiment of the present disclosure, there is provided a repeater device connected to a source device and a sink device, including: an input terminal that receives transmission data supplied from the source device as an input; relay means for relaying the transmission data input via the input terminal; an output terminal that outputs the transmission data relayed by the relay means to the sink device; control means for setting an operating mode of a limited state where a dynamic function of causing a superficial dynamic change and allowing a user to visually confirm the superficial dynamic change is deactivated and only a static function of not causing the superficial dynamic change is activated in response to a user's predetermined operation even when the source device and the sink device are connected to each other in a controllable state; and switch means for switching an activated state and a deactivated state of a connecting line to the sink device by controlling the ON and OFF states, the switch means being disposed in the connecting line used to relay and output the transmission data to the sink device by the relay means, wherein the control means deactivates the connecting line to the sink device by the use of the switch means and activates only the static function when it is selected that the operating mode of the limited state should be set.

According to this configuration, when the operating mode of the limited state is selected, the switch means can be controlled to deactivate the connecting line to the sink device and to activate only the static function. Accordingly, the dynamic function of causing the superficial dynamic change in response to the user's operation and allowing the user to visually confirm the superficial dynamic change is not activated.

According to the embodiment of the present disclosure, when an operating mode of a limited state is selected, switch means can be controlled to deactivate a connecting line to a sink device and to activate only a static function. Accordingly, a dynamic function of causing a superficial dynamic change in response to a user's operation and allowing the user to visually confirm the superficial dynamic change is not activated. As a result, it is possible to provide a repeater device and a control method, which can allow a combination function between devices connected to each other in a combinable state to work without any inconvenience to the user.

BRIEF DESCRIPTION OF THE DRAWINGS

FIG. 2 is a CEC table illustrating the correlation between devices and CEC logical addresses.

FIG. 9 is a diagram schematically illustrating the pin arrangement of HDMI terminals.

FIG. 17 is a flow diagram schematically illustrating a control sequence when a standby state is changed to a power-on state on the assumption of the CEC limited status.

FIG. 18 is a flow diagram schematically illustrating a control sequence when the standby state is changed to the power-on state on the assumption of the CEC combined status.

FIG. 21 is a flow diagram schematically illustrating a control sequence when the power-on state is changed to the standby state on the assumption of the CEC limited status.

FIG. 22 is a flow diagram schematically illustrating a control sequence when the power-on state is changed to the standby state on the assumption of the CEC combined status.

FIG. 23 is a flow diagram schematically illustrating a control sequence when the power-on state is changed to the AC-off state on the assumption of the CEC limited status.

FIG. 24 is a flow diagram schematically illustrating a control sequence when the power-on state is changed to the AC-off state on the assumption of the CEC combined status.

DETAILED DESCRIPTION

Hereinafter, preferred embodiments of the present disclosure will be described in detail. The description will be made in the following order.

1. Embodiment
2. Other Embodiments

1. Embodiment

1-1. Overall Configuration of System

Figure 1:
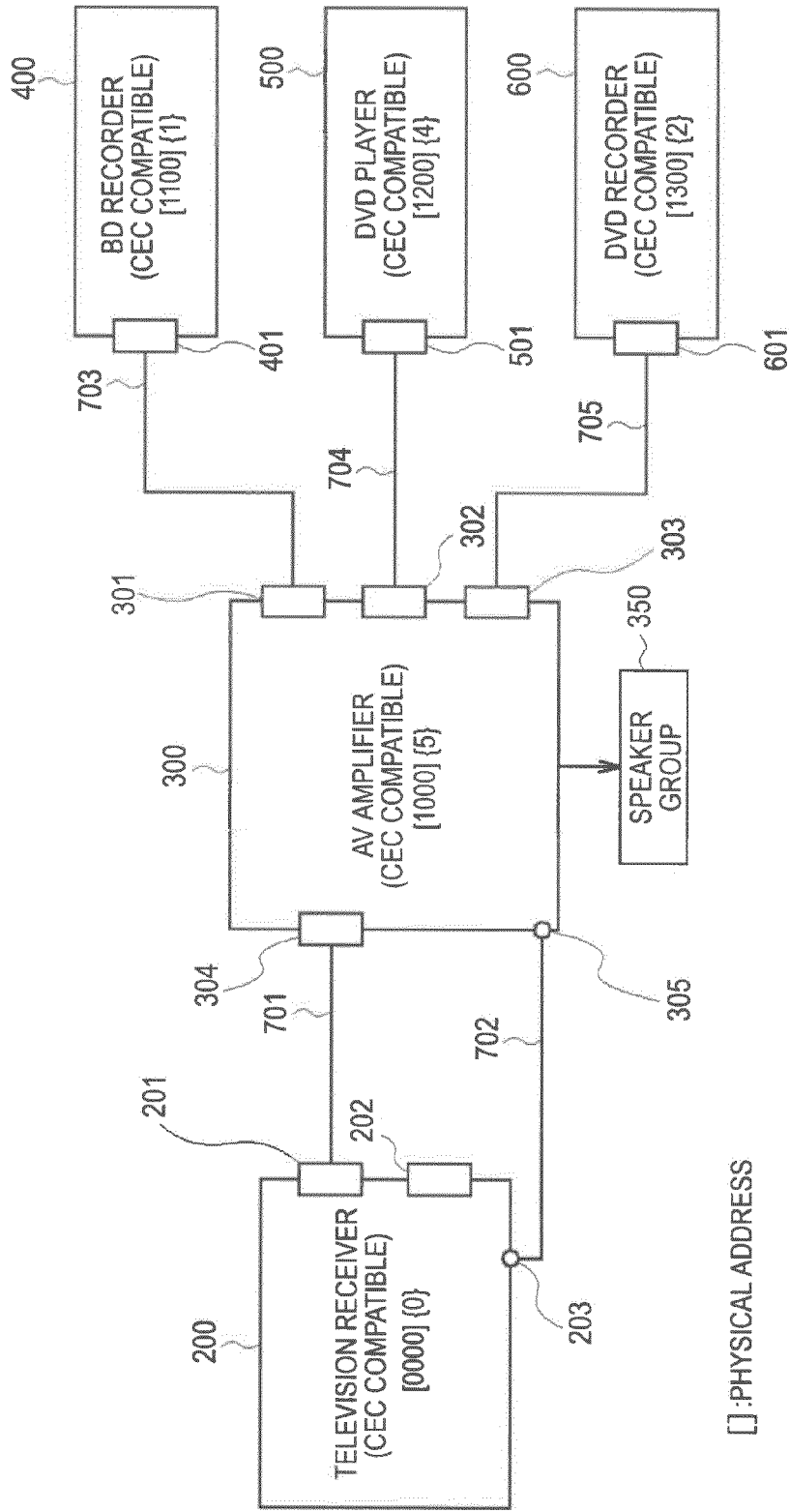
FIG. 1 is a block diagram schematically illustrating the overall configuration of an AV system.

In FIG. 1, reference numeral 100 represents an AV system according to an embodiment of the present disclosure, which has a configuration in which a television receiver 200, an AV amplifier 300, a BD (Blue-Ray Disc) recorder 400, a DVD player 500, and a DVD recorder 600 are HDMI-connected to each other centering the AV amplifier 300.

Here, the AV amplifier 300 constitutes an HDMI repeater device. The television receiver 200 constitutes an HDMI sink device. The BD recorder 400, the DVD player 500, and the DVD recorder 600 constitute an HDMI source device.

The BD recorder 400, the DVD player 500, and the DVD recorder 600 are devices using a video disc such as a blue-ray disc or a DVD or a hard disk as a recording medium and recording or reproducing video data (AV contents).

The television receiver 200 is a CEC compatible device and includes HDMI terminals 201 and 202 and an optical input terminal 203. The BD recorder 400 is a CEC compatible device and includes an HDMI terminal 401. The DVD player 500 is a CEC compatible device and includes an HDMI terminal 501. The DVD recorder 600 is a CEC compatible device and includes an HDMI terminal 601.

The AV amplifier 300 is a CEC compatible device and includes HDMI terminals 301, 302, 303, and 304 and an optical input terminal 305. The AV amplifier 300 is connected to a speaker group 350. For example, in order to realize a 5.1 ch environment, the speaker group 350 includes speakers located on a listener's front side, right-front side, left-front side, right-rear side, and left-rear side and a subwoofer speaker for bass output.

The television receiver 200 and the AV amplifier 300 are connected to each other via an HDMI cable 701 and an optical cable 702. That is, an end of the HDMI cable 701 is connected to the HDMI terminal 201 of the television receiver 200 and the other end thereof is connected to the HDMI terminal 304 of the AV amplifier 300. An end of the optical cable 702 is connected to the optical output terminal 203 of the television receiver 200 and the other end thereof is connected to the optical input terminal 305 of the AV amplifier 300.

The AV amplifier 300 and the BD recorder 400 are HDMI-connected to each other via an HDMI cable 703. That is, an end of the HDMI cable 703 is connected to the HDMI terminal 301 of the AV amplifier 300 and the other end thereof is connected to the HDMI terminal 401 of the BD recorder 400.

The AV amplifier 300 and the DVD player 500 are HDMI-connected to each other via an HDMI cable 704. That is, an end of the HDMI cable 704 is connected to the HDMI terminal 302 of the AV amplifier 300 and the other end thereof is connected to the HDMI terminal 501 of the DVD player 500.

The AV amplifier 300 and the DVD recorder 600 are HDMI-connected to each other via an HDMI cable 705. That is, an end of the HDMI cable 705 is connected to the HDMI terminal 303 of the AV amplifier 300 and the other end thereof is connected to the HDMI terminal 601 of the DVD recorder 600.

In the AV system 100, physical addresses and CEC logical addresses of the devices are acquired, for example, as follows.

That is, when the AV amplifier 300 is connected to the television receiver 200 (with a physical address [0000] and a CEC logical address {0}) via the HDMI cable 701, the AV amplifier 300 acquires the physical address [0000] from the television receiver 200 using an HDMI control protocol. Here, it is defined that the CEC compatible device acquires a logical address at the time of HDMI connection and transmits and receives a CEC message using the logical address.

FIG. 2 shows a table TL illustrating the correlation between the devices and the CEC logical addresses. In the table TL, "TV" in the device column includes a television receiver and a projector. "Recording Device" in the device column includes a BD recorder and a DVD recorder. "Tuner" in the device column includes an STB (Set Top Box). "Playback Device" in the device column includes a DVD player and a camcorder. "Audio System" in the device column is an AV amplifier.

For example, the AV amplifier 300 determines a logical address {5} as "Audio System" on the basis of the table TL shown in FIG. 2. In this case, the AV amplifier 300 recognizes that a device having the logical address {5} does not exist among the other devices through the use of a CEC message (<Polling Message>) based on the CEC control protocol and then determines the logical address {5} as its own logical address.

The AV amplifier 300 notifies the television receiver 200 that the physical address [1000] corresponds to the CEC compatible device with the logical address {5} through the use of a CEC message (<Report Physical Address>) based on the CEC control protocol.

When the BD recorder 400 is connected to the AV amplifier 300 via the HDMI cable 703, the BD recorder 400 acquires a physical address [1100] from the AV amplifier 300 using an HDMI control protocol.

The BD recorder 400 determines a logical address {1} as "Recording Device" on the basis of the table TL shown in FIG. 2. In this case, the BD recorder 400 recognizes that a device having the logical address {1} does not exist among the other devices through the use of the CEC message (<Polling Message>) based on the CEC control protocol and then determines the logical address {1} as its own logical address.

The BD recorder 400 notifies the television receiver 200 and the AV amplifier 300 that the physical address [1100] corresponds to the CEC compatible device with the logical address {1} through the use of the CEC message (<Report Physical Address>) based on the CEC control protocol.

When the DVD player 500 is connected to the AV amplifier 300 via the HDMI cable 704, the DVD player 500 acquires a physical address [1200] from the AV amplifier 300 using the HDMI control protocol.

The DVD player 500 determines a logical address {4} as "Playback Device" on the basis of the table TL shown in FIG. 2. In this case, the DVD player 500 recognizes that a device having the logical address {4} does not exist among the other devices through the use of the CEC message (<Polling Message>) based on the CEC control protocol and then determines the logical address {4} as its own logical address.

The DVD player 500 notifies the television receiver 200 and the AV amplifier 300 that the physical address [1200] corresponds to the CEC compatible device with the logical address {4} through the use of the CEC message (<Report Physical Address>) based on the CEC control protocol.

When the DVD recorder 600 is connected to the AV amplifier 300 via the HDMI cable 705, the DVD recorder 600 acquires a physical address [1300] from the AV amplifier 300 using the HDMI control protocol.

The DVD recorder 600 determines a logical address {2} as "Recording Device" on the basis of the table TL shown in FIG. 2. In this case, the DVD recorder 600 recognizes that a device having the logical address {2} does not exist among the other devices through the use of the CEC message (<Polling Message>) based on the CEC control protocol and then determines the logical address {2} as its own logical address.

The DVD recorder 600 notifies the television receiver 200 and the AV amplifier 300 that the physical address [1300] corresponds to the CEC compatible device with the logical address {2} through the use of the CEC message (<Report Physical Address>) based on the CEC control protocol.

In the AV system 100 (FIG. 1), when a program selected by the use of a tuner of the television receiver 200 is viewed, the following operation is performed. That is, an image based on a video signal acquired by the tuner is displayed on a display panel (not shown) of the television receiver 200.

An audio based on an audio signal acquired by the tuner is output from a speaker (not shown) of the television receiver 200 when the AV amplifier 300 is in an OFF state of a system audio mode. The audio based on the audio signal acquired by the tuner is output from a speaker group 350 connected to the AV amplifier 300 when the AV amplifier 300 is in the ON state of the system audio mode.

The audio signal acquired by the tuner of the television receiver 200 is, for example, an optical digital audio signal based on an S/PDIF (Sony/Philips Digital Interface) standard and is supplied to the AV amplifier 300 via the optical cable 702. The setting of the ON/OFF states of the system audio mode in the AV amplifier 300 can be performed through the use of a user operation unit (not shown) of the AV amplifier 300 and can also be performed through the use of a user operation unit (not shown) of the television receiver 200.

In the AV system 100 (FIG. 1), for example, when contents reproduced from a disc by the BD recorder 400 or a program selected by the tuner is viewed by means of a change operation from the television receiver 200, the operation of a playback button of the BD recorder 400, or the like, the operation is as follows.

That is, an image based on an output video signal of the BD recorder 400 is displayed on the display panel (not shown) of the television receiver 200. In this case, the output video signal of the BD recorder 400 is supplied to the television receiver 200 via the HDMI cable 703, the AV amplifier 300, and the HDMI cable 701.

An audio based on an output audio signal of the BD recorder 400 is output from the speaker (not shown) of the television receiver 200 when the AV amplifier 300 is in the OFF state of the system audio mode. In this case, the output audio signal of the BD recorder 400 is supplied to the television receiver 200 via the HDMI cable 703, the AV amplifier 300, and the HDMI cable 701.

The audio based on the output audio signal of the BD recorder 400 is output from the speaker group 350 connected to the AV amplifier 300 when the AV amplifier 300 is in the ON state of the system audio mode. In this case, the output audio signal of the BD recorder 400 is supplied to the AV amplifier 300 via the HDMI cable 703.

In the AV system 100 (FIG. 1), for example, when contents reproduced from a disc by the DVD player 500 is viewed by means of a change operation from the television receiver 200, the operation of a playback button of the DVD player 500, or the like, the operation is as follows.

That is, an image based on an output video signal of the DVD player 500 is displayed on the display panel (not shown)

of the television receiver 200. In this case, the output video signal of the DVD player 500 is supplied to the television receiver 200 via the HDMI cable 704, the AV amplifier 300, and the HDMI cable 701.

An audio based on an output audio signal of the DVD player 500 is output from the speaker (not shown) of the television receiver 200 when the AV amplifier 300 is in the OFF state of the system audio mode. In this case, the output audio signal of the DVD player 500 is supplied to the television receiver 200 via the HDMI cable 704, the AV amplifier 300, and the HDMI cable 701.

The audio based on the output audio signal of the DVD player 500 is output from the speaker group 350 connected to the AV amplifier 300 when the AV amplifier 300 is in the ON state of the system audio mode. In this case, the output audio signal of the DVD player 500 is supplied to the AV amplifier 300 via the HDMI cable 704.

In the AV system 100 (FIG. 1), for example, when contents reproduced from a disc by the DVD recorder 600 or a program selected by the tuner is viewed by means of the change operation from the television receiver 200 or the like, the operation is as follows.

That is, an image based on an output video signal of the DVD recorder 600 is displayed on the display panel (not shown) of the television receiver 200. In this case, the output video signal of the DVD recorder 600 is supplied to the television receiver 200 via the HDMI cable 705, the AV amplifier 300, and the HDMI cable 701.

An audio based on an output audio signal of the DVD recorder 600 is output from the speaker (not shown) of the television receiver 200 when the AV amplifier 300 is in the OFF state of the system audio mode. In this case, the output audio signal of the DVD recorder 600 is supplied to the television receiver 200 via the HDMI cable 705, the AV amplifier 300, and the HDMI cable 701.

The audio based on the output audio signal of the DVD recorder 600 is output from the speaker group 350 connected to the AV amplifier 300 when the AV amplifier 300 is in the ON state of the system audio mode. In this case, the output audio signal of the DVD recorder 600 is supplied to the AV amplifier 300 via the HDMI cable 705.

1-2. Configuration of Television Receiver

Figure 3:
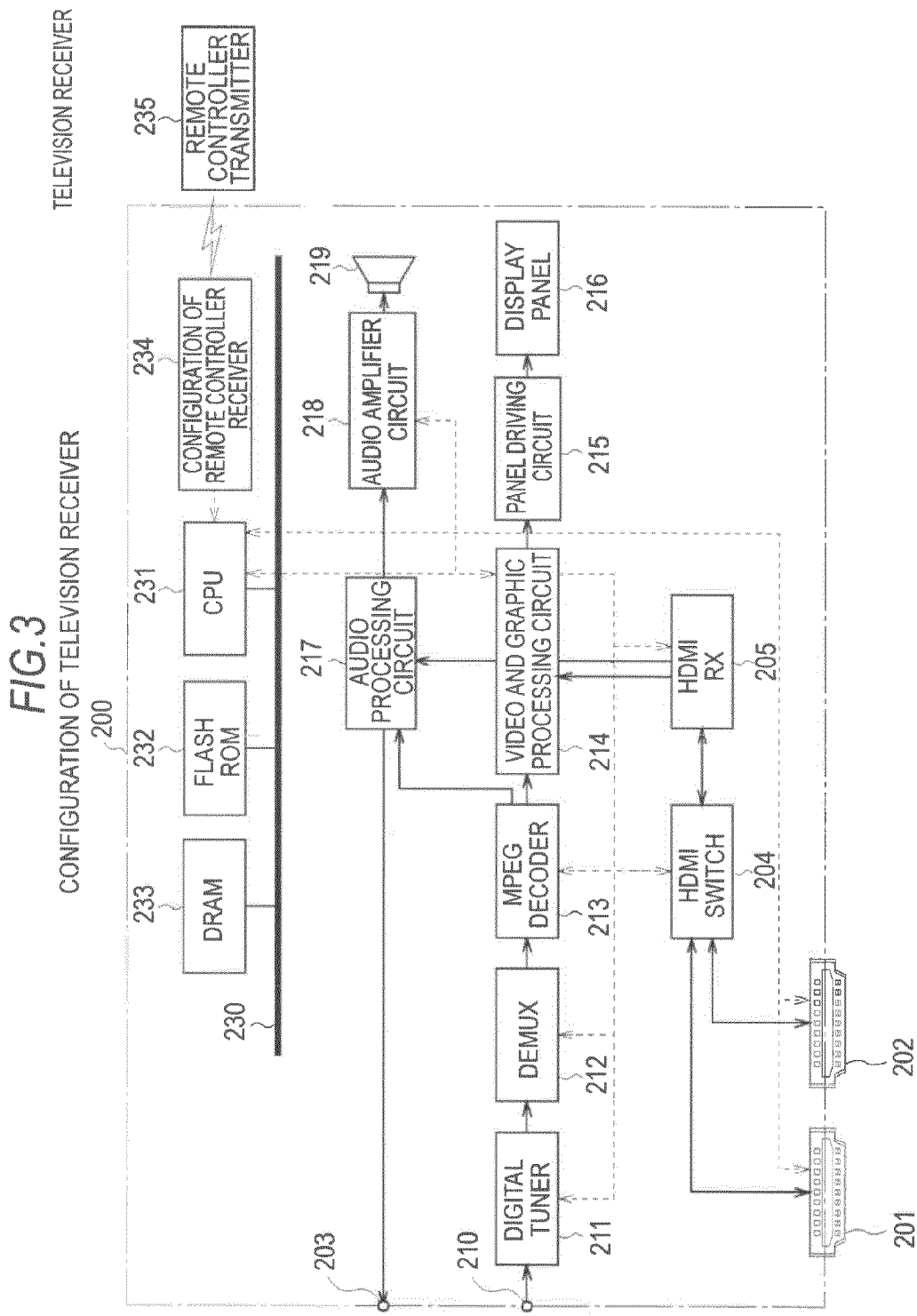
FIG. 3 is a block diagram schematically illustrating the circuit configuration of a television receiver.

As shown in FIG. 3, the television receiver 200 includes HDMI terminals 201 and 202, an optical output terminal 203, an HDMI switch 204, an HDMI reception unit 205, an antenna terminal 210, a digital tuner 211, a demultiplexer 212, an MPEG (Moving Picture Experts Group) decoder 213, a video and graphic processing circuit 214, a panel driving circuit 215, a display panel 216, an audio processing circuit 217, an audio amplifier circuit 218, a speaker 219, an internal bus 230, a CPU (Central Processing Unit) 231, a flash ROM (Read only Memory) 232, a DRAM (Dynamic Random Access Memory) 233, a remote controller receiver 234, and a remote controller transmitter 235.

The CPU 231 of the television receiver 200 controls the operations of the units or stores data in the flash ROM 232, by reading and starting control software stored in the flash ROM 232 into the DRAM 233. The CPU 231, the flash ROM 232, and the DRAM 233 are connected to the internal bus 230.

The remote controller receiver 234 receives, for example, a remote controller signal (remote controller code) of infrared rays transmitted from the remote controller transmitter 235 and supplies the received signal to the CPU 231. A user can operate the television receiver 200 and the other CEC compatible devices connected to the television receiver 200 via the HDMI cable, by operating the remote controller transmitter 235.

The antenna terminal 210 is a terminal receiving a television broadcast signal received by a reception antenna (not shown) as an input. The digital tuner 211 processes the television broadcast signal input to the antenna terminal 210 and outputs a predetermined transport stream corresponding to the channel selected by the user.

The demultiplexer 212 extracts a partial TS (Transport Stream) (TS packets of video data and TS packets of audio data) corresponding to the channel selected by the user from the transport stream acquired from the digital tuner 211.

The demultiplexer 212 extracts PSI/SI (Program. Specific Information/Service Information) from the transport stream acquired from the digital tuner 211 and outputs the extracted PSI/SI to the CPU 231. In the transport stream acquired from the digital tuner 211, plural channels are multiplexed. The process of extracting the partial TS of a channel from the transport stream by the use of the demultiplexer 212 can be performed by acquiring packet ID (PID) information of the channel from the PSI/SI (PAT/PMT).

The MPEG decoder 213 acquires video data by decoding a video PES (Packetized Elementary Stream) packet including TS packets of the video data acquired from the demultiplexer 212. The MPEG decoder 213 acquires audio data by decoding an audio PES packet including the TS packets of the audio data acquired from the demultiplexer 212.

The video and graphic processing circuit 214 performs a scaling process, graphic data superposing process, and the like on the video data acquired from the MPEG decoder 213 if necessary. The panel driving circuit 215 drives the display panel 216 on the basis of the video data output from the video and graphic processing circuit 214. The display panel 216 is constructed, for example, by an LCD (Liquid Crystal Display), a PDP (Plasma Display Panel), or the like.

The audio processing circuit 217 performs necessary processes such as D/A (Digital/Analog) conversion on the audio data acquired from the MPEG decoder 213. The audio amplifier circuit 218 amplifies the analog audio signal output from the audio processing circuit 217 and supplies the amplified analog audio signal to the speaker 219. The audio processing circuit 217 converts the audio data acquired from the MPEG decoder 213 into optical digital signals based on the S/PDIF standard and outputs the resultant optical digital signal to the optical output terminal 203.

The HDMI switch 204 selectively connects the HDMI terminals 201 and 202 to the HDMI reception unit 205. The HDMI reception unit 205 is selectively connected to one of the HDMI terminals 201 and 202 through the use of the HDMI switch 204.

The HDMI reception unit 205 receives the video data and the audio data of baseband unilaterally transmitted from an external device (a source device or a repeater device) connected to the HDMI terminals 201 and 202 by means of communication based on the HDMI. Details of the HDMI reception unit 205 will be described later.

The operation of the television receiver 200 will be described below in brief. A television broadcast signal input to the antenna terminal 210 is supplied to the digital tuner 211. The digital tuner 211 processes the television broadcast signal, acquires a transport stream corresponding to a channel selected by a user, and supplies the acquired transport stream to the demultiplexer 212.

The demultiplexer 212 extracts partial TS packets (TS packets of the video data and TS packets of the audio data)

corresponding to the channel selected by the user from the transport stream and supplies the extracted partial TS packets to the MPEG decoder 213.

The MPEG decoder 213 decodes the video PES packet including the TS packets of the video data and acquires the video data. The video and graphic processing circuit 214 performs a scaling process, a graphic data superposing process, and the like on the video data if necessary and then supplies the resultant video data to the panel driving circuit 215. Accordingly, an image corresponding to the channel selected by the user is displayed on the display panel 216.

The MPEG decoder 213 decodes the audio PES packet including the TS packets of the audio data and acquires the audio data. The audio data is subjected to a necessary process such as D/A conversion by the audio processing circuit 217, is amplified by the audio amplifier circuit 218, and is then supplied to the speaker 219. Accordingly, an audio corresponding to the channel selected by the user is output from the speaker 219.

The audio processing circuit 217 converts the audio data acquired from the MPEG decoder 213 into, for example, the optical digital signals based on the S/PDIF standard and outputs the optical digital signals to the optical output terminal 203. Accordingly, the television receiver 200 can transmit the audio data to the external device via the optical cable 702. In the AV system (FIG. 1), as described above, the audio data from the television receiver 200 is supplied to the AV amplifier 300 via the optical cable 702.

When the AV amplifier 300 is in the ON state of the system audio mode, the audio based on the audio data from the television receiver 200 is output from the speaker group 350 connected to the AV amplifier 300. In this case, the audio amplifier circuit 218 is changed to a muting state by the CPU 231 and the audio is not output from the speaker 219 of the television receiver 200.

The HDMI reception unit 205 acquires the video data and the audio data input to the HDMI terminals 201 and 202 via the HDMI cable. The video data is supplied to the video and graphic processing circuit 214 and the audio data is supplied to the audio processing circuit 217. Thereafter, similarly to the operation at the time of receiving the television broadcast signal, an image is displayed on the display panel 216 and an audio is output from the speaker 219.

In the AV system 100, for example, when the video and the audio based on the video data and the audio data from the BD recorder 400, the DVD player 500, or the DVD recorder 600 are viewed and listened to, as described above, the video and the audio based on the video data and the audio data acquired by the HDMI reception unit 205 are viewed and listened.

In this case, when the AV amplifier 300 is in the ON state of the system audio mode, the audio based on the audio data is output from the speaker group 350 connected to the AV amplifier 300, the audio amplifier circuit 218 of the television receiver 200 is changed to the muting state, and the audio is not output from the speaker 219.

1-3. Configuration of BD Recorder

Figure 4:
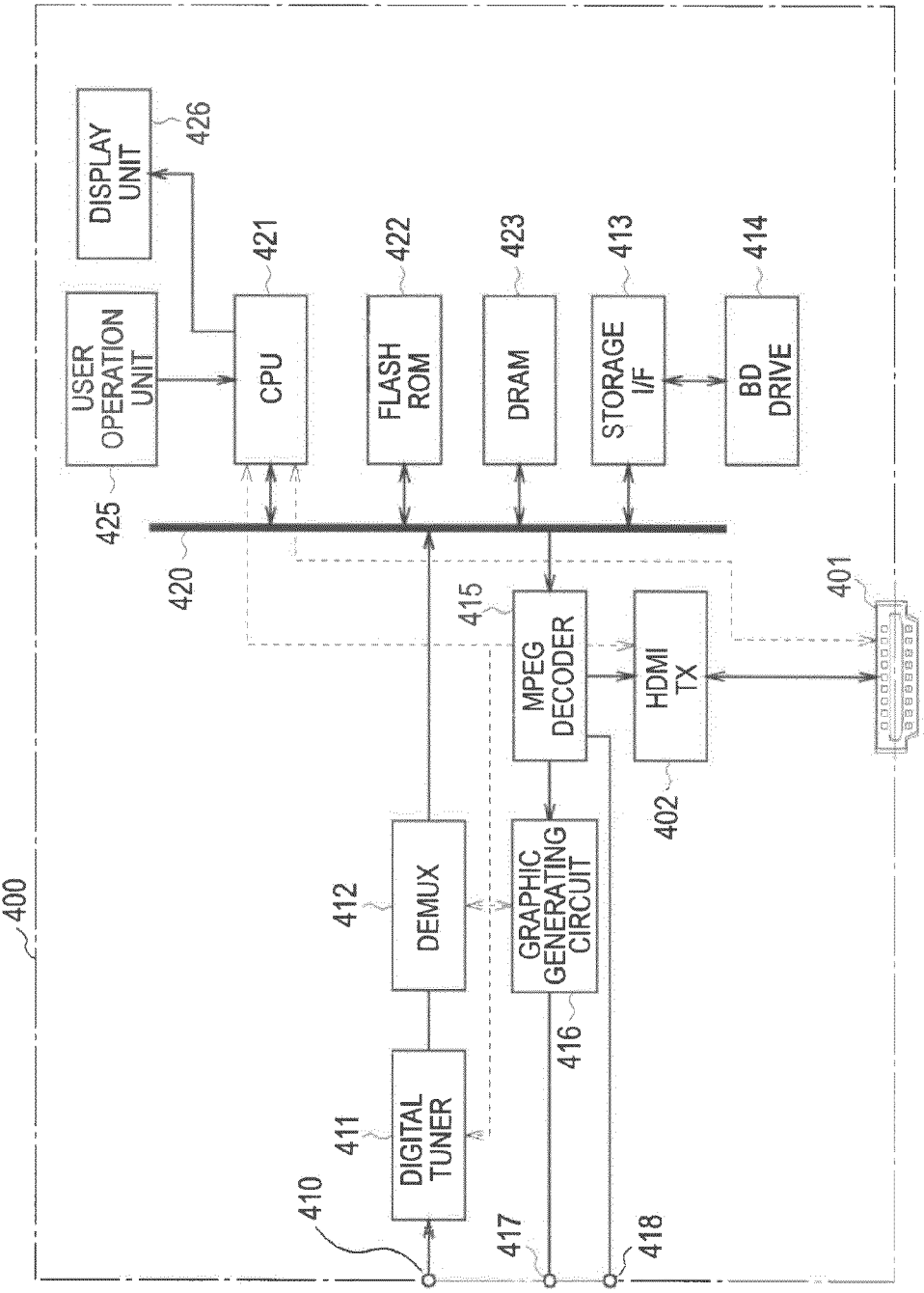
FIG. 4 is a block diagram schematically illustrating the circuit configuration of a BD recorder.

As shown in FIG. 4, the BD recorder 400 includes an HDMI terminal 401, an HDMI transmission unit 402, an antenna terminal 410, a digital tuner 411, a demultiplexer 412, a recording interface 413, a BD driver 414, an MPEG decoder 415, a graphic generating circuit 416, a video output terminal 417, an audio output terminal 418, an internal bus 420, a CPU 421, a flash ROM 422, and a DRAM 423.

The CPU 421 of the BD recorder 400 controls the operation of the units or stores data in the flash ROM 422, by reading and starting control software stored in the flash ROM 422 into the DRAM 423. The CPU 421, the flash ROM 422, and the DRAM 423 are connected to the internal bus 420.

The CPU 421 is connected to a user operation unit 425 and a display unit 426. The user operation unit 425 and the display unit 426 constitute a user interface. A user can operate the BD recorder 400 by the use of the user operation unit 425. The user operation unit 425 includes keys, buttons, a dial, and a remote controller transceiver disposed in a casing (not shown) of the BD recorder 400. The display unit 426 is constructed by an LCD or the like and displays the operating state of the BD recorder 400, the user's operation, and the like.

The antenna terminal 410 is a terminal to which a television broadcast signal received via a receiver antenna (not shown) is input. The digital tuner 411 processes the television broadcast signal input to the antenna terminal 410 and outputs a predetermined transport stream. The demultiplexer 412 extracts partial TS (video data TS packets and audio data TS packets) corresponding to a predetermined selected channel from the transport stream acquired by the digital tuner 411.

The demultiplexer 412 extracts the PSI/SI from the transport stream acquired by the digital tuner 411 and outputs the extracted PSI/SI to the CPU 421. In the transport stream acquired by the digital tuner 411, plural channels are multiplexed. The process of extracting partial TS of a channel from the transport stream by the use of the demultiplexer 412 can be performed by acquiring information of a packet ID (PID) of the corresponding channel from the PSI/SI (PAT/PMT).

The BD drive 414 is connected to the internal bus 420 via the recording interface 413. The BD drive 414 records the partial TS extracted by the demultiplexer 412 in a disc at the time of recording. The BD drive 414 reproduces the partial TS recorded on the disc at the time of reproduction.

The MPEG decoder 415 acquires video data by decoding video PES packets constituting the partial TS extracted by the demultiplexer 412 or reproduced by the BD drive 414. The MPEG decoder 415 acquires audio data by decoding audio PES packets constituting the partial TS.

The graphic generating circuit 416 performs a graphic data superposing process on the video data acquired by the MPEG decoder 415 if necessary. The video output terminal 417 outputs the video data output from the graphic generating circuit 416. The audio output terminal 418 outputs the audio data acquired by the MPEG decoder 415.

The HDMI transmission unit (HDMI source) 402 sends out the video data and the audio data of a baseband acquired by the MPEG decoder 415 from the HDMI terminal 401 by the communication based on the HDMI standard. The details of the HDMI transmission unit 402 will be described later.

The operation of the BD recorder 400 will be described below in brief. The television broadcast signal input to the antenna terminal 410 is supplied to the digital tuner 411. The digital tuner 411 processes the television broadcast signal, extracts a predetermined transport stream, and supplies the extracted transport stream to the demultiplexer 412.

The demultiplexer 412 extracts the partial TS (the video data TS packets and the audio data TS packets) corresponding to a predetermined channel from the transport stream. The partial TS is supplied to the BD drive 414 via the recording interface 413 and is recorded on the basis of a recording instruction from the CPU 421.

As described above, the partial TS extracted by the demultiplexer 412 or the partial TS reproduced by the BD drive 414 is supplied to the MPEG decoder 415.

The MPEG decoder 415 can acquire the video data by decoding video PES packets including the TS packets. The video data is subjected to the graphic data superposing process and is then output to the video output terminal 417 by the graphic generating circuit 416. The MPEG decoder 415 can acquire the audio data by decoding audio PES packets including the TS packets. The audio data is output to the audio output terminal 418.

As described above, the video data and the audio data of a baseband acquired by the MPEG decoder 415 are supplied to the HDMI transmission unit 402 and are sent out from the HDMI transmission unit 402 to an external device via the HDMI terminal 401.

1-4. Configurations of DVD Player and DVD Recorder

Although not described in detail for the purpose of convenience, the DVD player 500 has a configuration in which the BD drive 414 in the BD recorder 400 is replaced with a DVD drive and the recording system thereof is removed.

Although not described in detail for the purpose of convenience, the DVD recorder 600 has a configuration in which the BD drive 414 in the BD recorder 400 is replaced with a DVD drive.

1-5. Configuration of AV Amplifier

Figure 5:
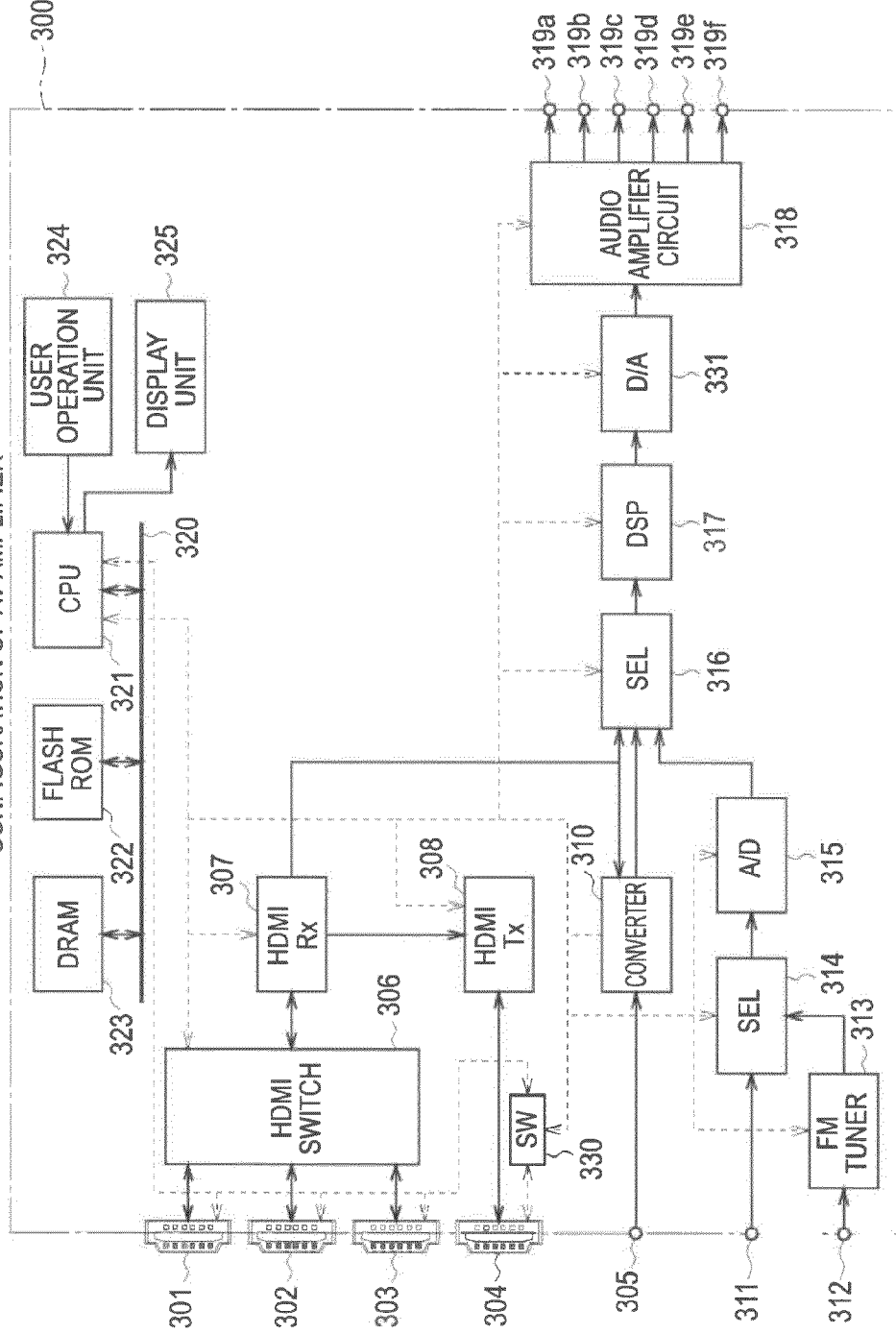
FIG. 5 is a block diagram schematically illustrating the circuit configuration of an AV amplifier.

As shown in FIG. 5, the AV amplifier 300 includes HDMI terminals 301 to 304, an optical input terminal 305, an HDMI switch 306, an HDMI reception unit 307, an HDMI transmission unit 308, a converter 310, an analog audio input terminal 311, an antenna terminal 312, an FM tuner 313, a selector 314, an A/D (Analog/Digital) converter 315, a selector 316, a DSP (Digital Signal Processor) 317, a D/A (Digital/Analog) converter 331, an audio amplifier circuit 318, audio output terminals 319a to 319f, an internal bus 320, a CPU 321, a flash ROM 322, a DRAM 323, and a switch circuit 330 including a relay.

The CPU 321 of the AV amplifier 300 controls the operations of the units or stores data in the flash ROM 322, by reading and starting control software stored in the flash ROM 322 into the DRAM 323. The CPU 321, the flash ROM 322, and the DRAM 323 are connected to the internal bus 320.

The CPU 321 is connected to a user operation unit 324 and a display unit 325. The user operation unit 324 and the display unit 325 constitute a user interface. A user can select an output audio from the AV amplifier 300, select a channel of the FM tuner 313, or set the operation by the use of the user operation unit 324. The user can set the ON and OFF of a system audio mode or can set a CEC combined status or a CEC limited status to be described later by the use of the user operation unit 324.

The user operation unit 324 includes keys, buttons, a dial, and a remote controller transceiver disposed on the surface of a casing (not shown) of the AV amplifier 300. The display unit 325 is constructed by an LCD or the like and displays the operating state of the AV amplifier 300, the user's operating state, and the like.

The optical input terminal 305 is a terminal to which a digital optical signal, for example, based on the S/PDIF standard is input via an optical cable. The converter 310 generates right and left audio data of 24 bits RDATA and LDATA and a bit clock BCK synchronized with each bit of the data from the digital optical signal input to the optical input terminal 305 and supplies the generated signals to the selector 316.

The converter 310 generates a clock CK having the same frequency (for example, 44.1 kHz) as a sampling frequency of the audio signal and a master clock MCK which is a multiple, for example, 512 times or 256 times, of the sampling frequency from the reproduction data of AV contents input via one of the HDMI terminals 301 to 303 and the switch circuit 330 including a relay from the DB recorder 400, the DVD player 500, or the DVD recorder 600, and supplies the generated clocks to the CPU 321.

The analog audio input terminal 311 is a terminal to which right and left analog audio signals acquired from an external device are input. The antenna terminal 312 is a terminal to which an FM broadcast signal received by an FM receiving antenna (not shown) is input.

The FM tuner 313 processes the FM broadcast signal input to the antenna terminal 312 and outputs the right and left analog audio signals corresponding to the channel selected by the user. The selector 314 selectively takes out the analog audio signal input to the analog audio input terminal 311 or the analog audio signal output from the tuner 313. The A/D converter 315 converts the analog audio signal taken out by the selector 314 into digital audio data and supplies the digital audio data to the selector 316.

The HDMI switch 306 selectively connects the HDMI terminals 301 to 303 to the HDMI reception unit 307. The HDMI reception unit 307 is selectively connected to one of the HDMI terminals 301 to 303 by the HDMI switch 306. The HDMI reception unit 307 receives the video data and the audio data of a baseband unilaterally transmitted from the external devices (source devices) connected to the HDMI terminals 301 to 303 by the communication based on the HDMI standard.

The HDMI reception unit 307 supplies the audio data to the selector 316 and supplies the video data and the audio data to the HDMI transmission unit 308. The HDMI transmission unit 308 transmits the video data and the audio data of the baseband supplied from the HDMI reception unit 307 from the HDMI terminal 304 by the communication based on the HDMI standard. Accordingly, the AV amplifier 300 performs a repeater function. The details of the HDMI reception unit 307 and the HDMI transmission unit 308 will be described later.

The selector 316 selectively takes out the audio data supplied from the HDMI reception unit 307, the audio data supplied from the converter 310, or the audio data supplied from the A/D converter 315, and supplies the selected audio data to the DSP 317.

The DSP 317 processes the audio data supplied via the selector 316 by the use of an internal buffer, performs a process of generating audio data of channels for realizing a 5.1 ch environment, a process of converting a digital signal into an analog signal, and the like, and sends the resultant audio data to the D/A converter 331.

The D/A converter 331 converts the digital audio data into analog data on the basis of a built-in clock. At this time, it is necessary to output the audio data from the DSP 317 so as to correspond to the rate of the built-in clock ICK of the D/A converter.

At this time, when the master clock MCK supplied via the converter 310 is different in clock frequency from the built-in clock ICK of the D/A converter, the audio data stored in the internal buffer of the DSP 317 by the CPU 321 may overflow or underflow.

Therefore, in order to remove the difference in clock frequency between the built-in clock ICK of the D/A converter and the master clock MCK supplied via the converter 310, the CPU 321 outputs a clock adjusting command to increase or decrease the clock frequency to the BD recorder 400, the DVD player 500, or the DVD recorder 600 of the reproduction side via the HDMI terminal 301, 302, or 303.

Accordingly, the AV amplifier 300 can avoid the risk of overflow or underflow by synchronizing the built-in clock ICK of the D/A converter 331 with the clock of the DB recorder 400, the DVD player 500, or the DVD recorder 600 of the reproduction side.

At this time, even when a clock jitter occurs in the master clock MCK generated on the basis of the reproduction data from the BD recorder 400, the DVD player 500, or the DVD recorder 600 of the reproduction side, the AV amplifier 300 can synchronize the master clock with the built-in clock ICK of the D/A converter, thereby excluding the influence of the clock jitter in advance.

The audio amplifier circuit 318 amplifies a front-left audio signal $S_{FL}$, a front-right audio signal $S_{FR}$, a front-center audio signal $S_{FC}$, a rear-left audio signal $S_{RL}$, a rear-right audio signal $S_{RR}$, and a subwoofer audio signal $S_{SW}$ output from the DSP 317, and outputs the amplified audio signals to the audio output terminals 319a to 319f.

Although not shown, the audio output terminals 319a to 319f are connected to a front-left speaker, a front-right speaker, a front-center speaker, a rear-left speaker, a rear-right speaker, and a subwoofer speaker constituting the speaker group 350, respectively.

In the AV amplifier 300, the switch circuit 330 including a relay is disposed between the HDMI terminal 304 and the CPU 321 (that is, in the CEC line marked by a broken line). Accordingly, the AV amplifier 300 can control the transmission of a CEC message to the television receiver 200 HDMI-connected thereto via the HDMI terminal 304. The CEC line control using the switch circuit 330 in the AV amplifier 300 will be described later.

The operation of the AV amplifier 300 will be described below in brief. The HDMI reception unit 307 can acquire the video data and the audio data of a baseband input to the HDMI terminal 301, 302, or 303 via the HDMI cables 703, 704, or 705. The video data and the audio data are supplied to the HDMI transmission unit 308 and are sent to the HDMI cable 701 connected to the HDMI terminal 304.

The audio data acquired by the HDMI reception unit 307 is supplied to the selector 316. The selector 316 selectively takes out the audio data supplied from the HDMI reception unit 307, the audio data supplied from the converter 310, or the audio data supplied from the A/D converter 315 and supplies the taken audio data to the DSP 317.

The DSP 317 performs necessary processes such as the process of generating the audio data of the channels for realizing the 5.1 ch environment, the process of converting a digital signal into an analog signal, and the like on the audio data. The audio signals of the channels output from the DSP 317 are output to the audio output terminals 319a to 319f via the D/A converter 331 and the audio amplifier circuit 318.

For example, when a program selected by the digital tuner 211 of the television receiver 200 is watched and the AV amplifier 300 is in the ON state of the system audio mode, the AV system 100 (FIG. 1) works as follows.

That is, the selector 316 takes out the audio data from the converter 310. Accordingly, the audio signals of the channels associated with the audio data of the program selected by the digital tuner 211 of the television receiver 200 are output to the audio output terminals 319a to 319f. As a result, the audio of the program selected by the digital tuner 211 of the television receiver 200 is output from the speaker group 350 connected to the AV amplifier 300.

When a program selected by the digital tuner 211 of the television receiver 200 is watched and the AV amplifier 300 is in the OFF state of the system audio mode, the audio amplifier circuit 318 is in the muting state and thus no audio signal is supplied to the audio output terminals 319a to 319f from the audio amplifier circuit 318.

When the video and the audio based on the video data and the audio data from the BD recorder 400 are viewed and heard and the AV amplifier 300 is in the ON state of the system audio mode, the AV system 100 (FIG. 1) works as follows.

That is, the HDMI terminal 301 is connected to the HDMI reception unit 307 by the HDMI switch 306. The selector 316 takes out the audio data from the HDMI reception unit 307. Accordingly, the audio signals of the channels associated with the audio data from the BD recorder 400 are output to the audio output terminals 319a to 319f. As a result, the audio based on the audio data from the BD recorder 400 is output from the speaker group 350 connected to the AV amplifier 300.

When the video and the audio based on the video data and the audio data from the BD recorder 400 are viewed and heard and the AV amplifier 300 is in the OFF state of the system audio mode, the audio amplifier circuit 318 is in the muting state and thus no audio signal is supplied to the audio output terminals 319a to 319f from the audio amplifier circuit 318.

When the video and the audio based on the video data and the audio data from the DVD player 500 are viewed and heard and the AV amplifier 300 is in the ON state of the system audio mode, the AV system 100 (FIG. 1) works as follows.

That is, the HDMI terminal 302 is connected to the HDMI reception unit 307 by the HDMI switch 306. The selector 316 takes out the audio data from the HDMI reception unit 307. Accordingly, the audio signals of the channels associated with the audio data from the DVD player 500 are output to the audio output terminals 319a to 319f. As a result, the audio based on the audio data from the DVD player 500 is output from the speaker group 350 connected to the AV amplifier 300.

When the video and the audio based on the video data and the audio data from the DVD player 500 are viewed and heard and the AV amplifier 300 is in the OFF state of the system audio mode, the audio amplifier circuit 318 is in the muting state and thus no audio signal is supplied to the audio output terminals 319a to 319f from the audio amplifier circuit 318.

When the video and the audio based on the video data and the audio data from the DVD recorder 600 are viewed and heard and the AV amplifier 300 is in the ON state of the system audio mode, the AV system 100 (FIG. 1) works as follows.

That is, the HDMI terminal 303 is connected to the HDMI reception unit 307 by the HDMI switch 306. The selector 316 takes out the audio data from the HDMI reception unit 307. Accordingly, the audio signals of the channels associated with the audio data from the DVD recorder 600 are output to the audio output terminals 319a to 319f. As a result, the audio based on the audio data from the DVD recorder 600 is output from the speaker group 350 connected to the AV amplifier 300.

When the video and the audio based on the video data and the audio data from the DVD recorder 600 are viewed and heard and the AV amplifier 300 is in the OFF state of the system audio mode, the audio amplifier circuit 318 is in the muting state and thus no audio signal is supplied to the audio output terminals 319a to 319f from the audio amplifier circuit 318.

In addition, when the audio data supplied from the A/D converter 315 is taken out by the selector 316, that is, when the audio based on the analog audio signal input to the analog audio input terminal 311 is output or when the audio based on the audio data acquired from the FM tuner 313 is output, the following operation is performed.

That is, the selector 316 takes out the audio data from the A/D converter 315. Accordingly, the audio based on the analog audio signal or the FM audio signal is output from the speaker group 350 connected to the audio output terminals 319a to 319f.

1-6. Transmission Configuration and Process Based on HDMI Standard

Figure 6:
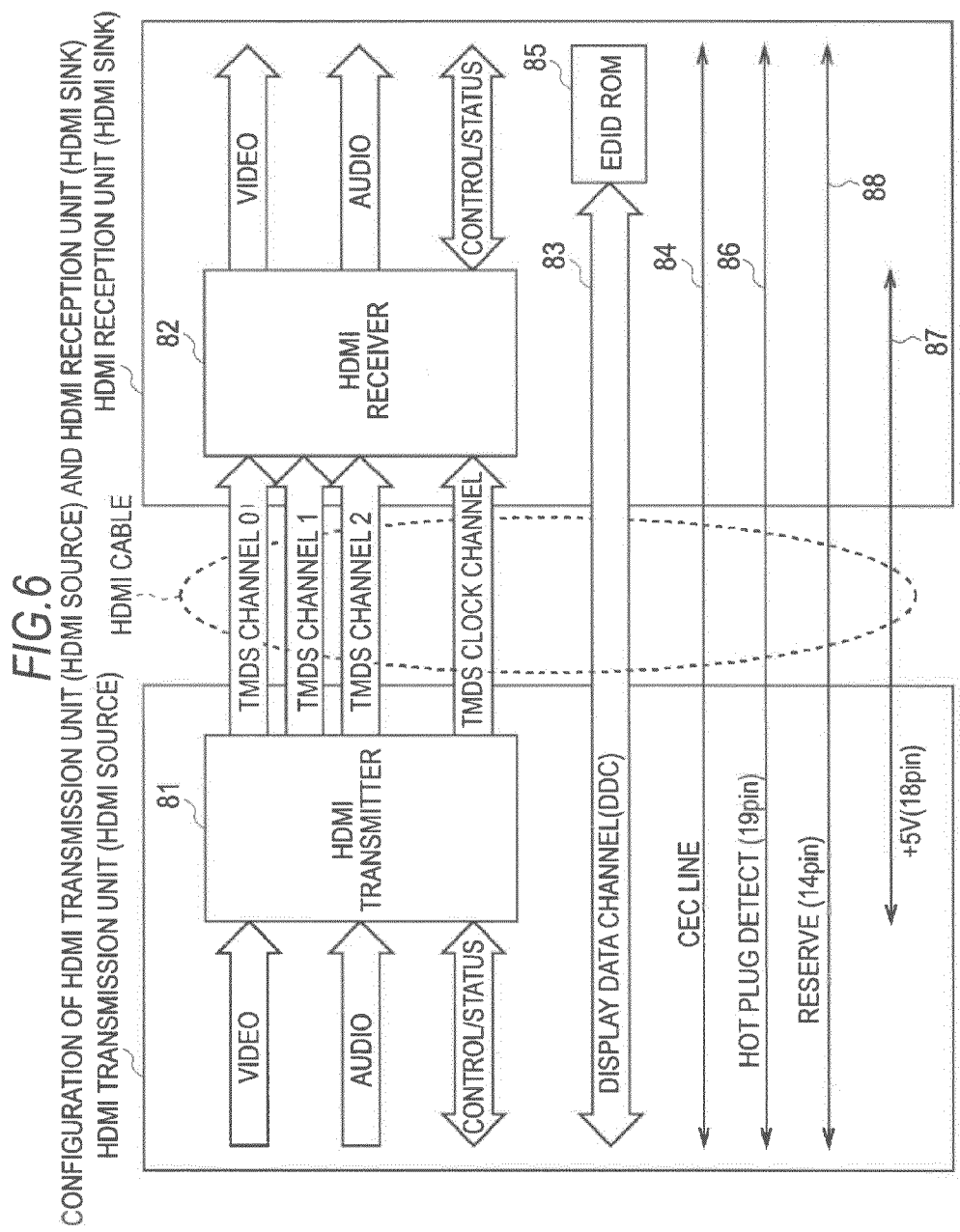
FIG. 6 is a diagram schematically illustrating the configuration of an HDMI transmission unit (HDMI source) and an HDMI reception unit (HDMI sink).

FIG. 6 is a diagram illustrating the configurations of an HDMI transmission unit (the HDMI transmission unit 308 and the HDMI transmission unit 402) and an HDMI reception unit (the HDMI reception unit 205 and the HDMI reception unit 307).

The HDMI transmission unit (the HDMI source) unilaterally transmits differential signals corresponding to uncompressed pixel data of a one-frame image to the HDMI reception unit (the HDMI sink) over plural channels in an active pixel period (hereinafter, appropriately referred to as an active video period) obtained by excluding a horizontal blanking period and a vertical blanking period from a period from a vertical synchronization signal to a subsequent vertical synchronization signal, and unilaterally transmits differential signals corresponding to the audio data or control data accompanied with the image and other auxiliary data to the HDMI reception unit over plural channels in the horizontal blanking period or the vertical blanking period.

That is, the HDMI transmission unit includes an HDMI transmitter 81, converts, for example, the pixel data of an uncompressed image into the differential signals by the use of the HDMI transmitter 81, and unilaterally serially transmits the differential signals to the HDMI reception unit connected thereto via the HDMI cable over three TMDS channels #0, #1, and #2 as the plural channels.

The HDMI transmitter 81 converts the audio data accompanied with the uncompressed image, the necessary control data, and other auxiliary data into corresponding differential signals and unilaterally serially transmits the differential signals to the HDMI reception unit connected thereto via the HDMI cable over three TMDS channels #0, #1, and #2.

The HDMI transmitter 81 transmits pixel clocks synchronized with the pixel data transmitted over three TMDS channels #0, #1, and #2 to the HDMI reception unit connected thereto via the HDMI cable over a TDMS clock channel. Here, through one TMDS channel #i (where i=0, 1, 2), the pixel data of 10 bits is transmitted during one clock of the pixel clocks.

The HDMI reception unit receives the differential signals corresponding to the pixel data unilaterally transmitted from the HDMI transmission unit over the plural channels in the active video period. The HDMI reception unit receives the differential signals corresponding to the audio data or the control data unilaterally transmitted from the HDMI transmission unit over the plural channels during the horizontal blanking period or the vertical blanking period.

That is, the HDMI reception unit includes an HDMI receiver 82. The HDMI receiver 82 receives the differential signals corresponding to the pixel data unilaterally transmitted from the HDMI transmission unit connected thereto via the HDMI cable and the differential signals corresponding to the audio data or the control data over the TDMS channels #0, #1, and #2 in synchronization with the pixel clocks transmitted from the same HDMI transmission unit over the TMDS clock channel.

The transmission channels in the HDMI system including the HDMI transmission unit and the HDMI reception unit includes a transmission channel called a DDC (Display Data Channel) 83 or a CEC line 84, in addition to three TMDS channels #0, #1, and #2 as a transmission channel over which the pixel data and the audio data are unilaterally serially transmitted from the HDMI transmission unit and the HDMI reception unit in synchronization with the pixel clocks and the TMDS clock channel as a transmission channel over which the pixel clocks are transmitted.

The DDC 83 includes two signal lines (not shown) included in the HDMI cable and is used for the HDMI transmission unit to read E-EDID (Enhanced Extended Display Identification Data) from the HDMI reception unit connected thereto via the HDMI cable.

That is, the HDMI reception unit includes its own configuration in addition to the HDMI receiver 82. The HDMI transmission unit reads the E-EDID of the HDMI reception unit from the HDMI reception unit connected thereto via the HDMI cable through the DDC 83 and recognizes the format (profile), such as RGB, YCbCr 4:4:4, and YCbCr 4:2:2, of an image corresponding to an electronic apparatus having the HDMI reception unit on the basis of the E-EDID.

The CEC line 84 includes one signal line included in the HDMI cable and is used to perform the bidirectional communication of the control data between the HDMI transmission unit and the HDMI reception unit.

The HDMI cable includes a line 86 connected to a pin called HPD (Hot Plug Detect). The source device can detect the connection of a sink device using the line 86. The HDMI cable includes a line 87 used to supply power to the sink device from the source device. The HDMI cable includes a reserved line 88.

Figure 7:
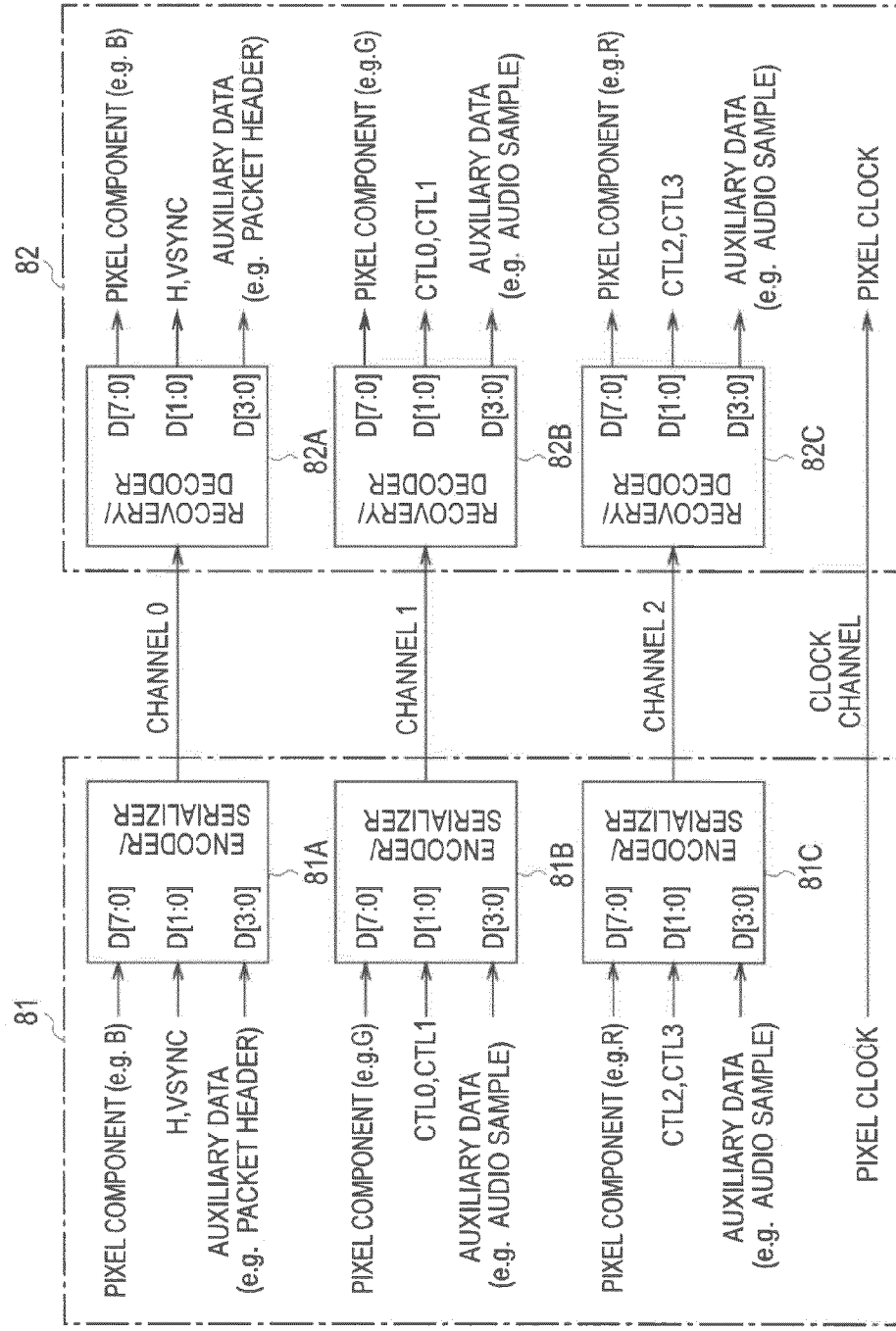
FIG. 7 is a diagram schematically illustrating the configuration of an HDMI transmitter and an HDMI receiver.

As shown in FIG. 7, the HDMI transmitter 81 includes three encoder/serializers 81A, 81B, and 81C corresponding to three TMDS channels #0, #1, and #2. Each of the encoder/serializers 81A, 81B, and 81C encodes the video data, the auxiliary data, and the control data supplied thereto, converts parallel data into serial data, and transmits the serial data through the use of differential signals.

Here, when the video data has three components of R (red), G (green), and B (blue), the B component is supplied to the encoder serializer 81A, the G component is supplied to the encoder/serializer 81B, and the R component is supplied to the encoder/serializer 81C.

The auxiliary data includes, for example, the audio data or the control packet, the control packet is supplied to the encoder/serializer 81A, and the audio data is supplied to the encoder/serializers 81B and 81C.

The control data includes a vertical synchronization signal (VSYNC) of one bit, a horizontal synchronization signal (HSYNC) of one bit, and control bits CTL0 CTL1, CTL2, and CTL3 of one bit. The vertical synchronization signal and the horizontal synchronization signal are supplied to the encoder/serializer 81A. The control bits CTL0 and CTL1 are supplied to the encoder/serializer 81B and the control bits CTL2 and CTL3 are supplied to the encoder/serializer 81C.

The encoder/serializer 81A transmits the B component of the video data, the vertical synchronization signal, the horizontal synchronization signal, and the auxiliary data supplied thereto in a time-sharing manner. That is, the encoder/serializer 81A converts the B component of the video data supplied thereto into parallel data of 8 bits which is the fixed number of bits, encodes the parallel data, converts the encoded parallel data into serial data, and then transmits the serial data over the TMDS channel #0.

The encoder/serializer 81A encodes parallel data of two bits of the vertical synchronization signal and the horizontal synchronization signal supplied thereto, converts the encoded parallel data into serial data, and then transmits the serial data over the TMDS channel #0.

The encoder/serializer 81A converts the auxiliary data supplied thereto into parallel data of four bits, encodes the parallel data, converts the encoded parallel data to serial data, and then transmits the serial data over the TMDS channel #0.

The encoder/serializer 81B transmits the G component of the video data, the control bits CTL0 and CTL1, and the auxiliary data supplied thereto in a time-sharing manner. That is, the encoder/serializer 81B converts the G component of the video data supplied thereto into parallel data of 8 bits which is the fixed number of bits, encodes the parallel data, converts the encoded parallel data into serial data, and then transmits the serial data over the TMDS channel #1.

The encoder/serializer 81B encodes parallel data of two bits of the control bits CTL0 and CTL1 supplied thereto, converts the encoded parallel data into serial data, and then transmits the serial data over the TMDS channel #1.

The encoder/serializer 81B converts the auxiliary data supplied thereto into parallel data of four bits, encodes the parallel data, converts the encoded parallel data to serial data, and then transmits the serial data over the TMDS channel #1.

The encoder/serializer 81C transmits the R component of the video data, the control bits CTL2 and CTL3, and the auxiliary data supplied thereto in a time-sharing manner. That is, the encoder/serializer 81C converts the R component of the video data supplied thereto into parallel data of 8 bits which is the fixed number of bits, encodes the parallel data, converts the encoded parallel data into serial data, and then transmits the serial data over the TMDS channel #2.

The encoder/serializer 81C encodes parallel data of two bits of the control bits CTL2 and CTL3 supplied thereto, converts the encoded parallel data into serial data, and then transmits the serial data over the TMDS channel #2.

The encoder/serializer 81C converts the auxiliary data supplied thereto into parallel data of four bits, encodes the parallel data, converts the encoded parallel data to serial data, and then transmits the serial data over the TMDS channel #2.

The HDMI receiver 82 includes three recovery/decoders 82A, 82B, and 82C corresponding to three TMDS channels #0, #1, and #2. Each of the recovery/decoders 82A, 82B, and 82C receives the video data, the auxiliary data, and the control data transmitted as the differential signals over the TMDS channels #0, #1, and #2. Each of the recovery/decoders 82A, 82B, and 82C converts the video data, the auxiliary data, and the control data from serial data to parallel data, and decodes and outputs the parallel data.

That is, the recovery/decoder 82A receives the B component of the video data, the vertical synchronization signal, the horizontal synchronization data, and the auxiliary data transmitted as the differential signals over the TMDS channel #0. The recovery/decoder 82A converts the B component of the video data, the vertical synchronization signal, the horizontal synchronization data, and the auxiliary data from the serial data to the parallel data, and decodes and outputs the parallel data.

The recovery/decoder 82B receives the G component of the video data, the control bits CTL0 and CTL1, and the auxiliary data transmitted as the differential signals over the TMDS channel #1. The recovery/decoder 82B converts the G component of the video data, the control bits CTL0 and CTL1, and the auxiliary data from the serial data to the parallel data, and decodes and outputs the parallel data.

The recovery/decoder 82C receives the R component of the video data, the control bits CTL2 and CTL3, and the auxiliary data transmitted as the differential signals over the TMDS channel #2. The recovery/decoder 82C converts the R component of the video data, the control bits CTL2 and CTL3, and the auxiliary data from the serial data to the parallel data, and decodes and outputs the parallel data.

Figure 8:
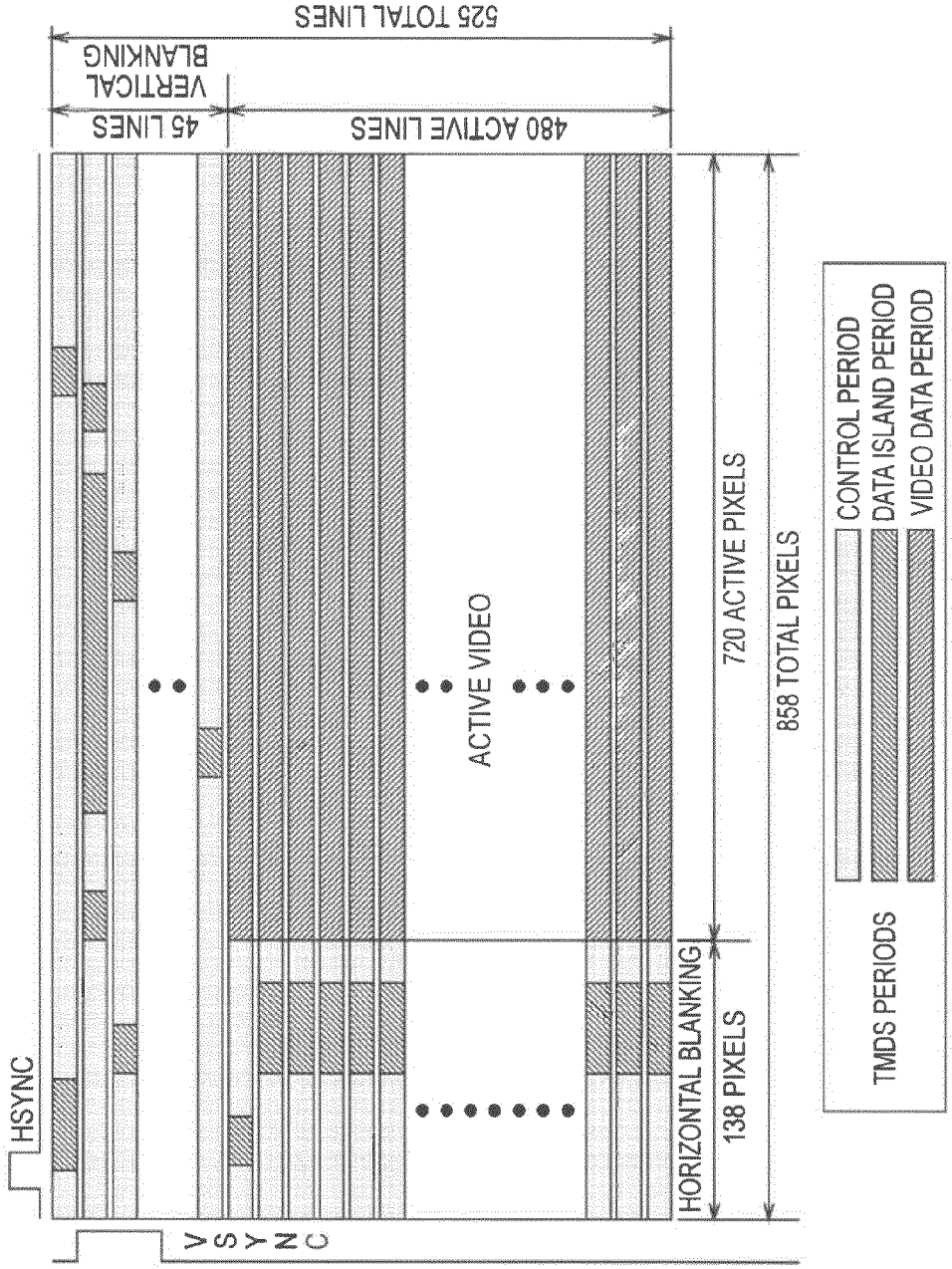
FIG. 8 is a diagram schematically illustrating the structure of TMDS transmission data.

FIG. 8 shows an example of a transmission period in which a variety of transmission data is transmitted through three TMDS channels #0, #1, and #2 of the HDMI. FIG. 8 shows various transmission data periods when a progressive video of 720×480 pixels is transmitted over the TMDS channels #0, #1, and #2.

A video field in which the transmission data is transmitted over three TMDS channels #0, #1, and #2 of the HDMI includes three types of periods of a video data period, a data island period, and a control period depending on the types of the transmission data.

Here, the video field period is a period from an active edge of a vertical synchronization signal to an active edge of a subsequent vertical synchronization signal and is divided into a horizontal blanking period, a vertical blanking period, and an active video period which is a period obtained by excluding the horizontal blanking period and the vertical blanking period from the video field period.

The video data period can be allocated to the active video period. In the video data period, active pixel data corresponding to 720 pixels×480 lines constituting the video data of one uncompressed frame is transmitted.

The data island period and the control period can be allocated to the horizontal blanking period and the vertical blanking period. The auxiliary data is transmitted in the data island period and the control period.

That is, the data island period can be allocated to a part of the horizontal blanking period and the vertical blanking period. For example, packets of the audio data which is data not associated with control among the auxiliary data are transmitted in the data island period.

The control period can be allocated to the other part of the horizontal blanking period and the vertical blanking period. For example, the vertical synchronization signal, the horizontal synchronization data, and the control packets which are data associated with control among the auxiliary data are transmitted in the control period.

Here, in the present HDMI standard, the frequency of a pixel clock transmitted over the TMDS clock channel is, for example, 165 MHz. In this case, the transmission rate of the data island period is about 500 Mbps.

FIG. 9 shows a type-A pin arrangement of the HDMI terminals. Two lines which are differential lines through which TMDS Data #i+ and TMDS Data #i− as the differential signals of the TMDS channel #i are transmitted are connected to pins (with pin numbers of 1, 4, and 7) to which the TMDS Data #i+ can be allocated and pins (with pin numbers of 3, 6, and 9) to which the TMDS Data #i− can be allocated, respectively.

The CEC line 84 (FIG. 6) through which the CEC message as the control data is transmitted is connected to a pin with a pin number of 13 and a pin with a pin number of 14 is a reserved pin.

The line through which an SDA (Serial Data) signal such as the E-EDID is transmitted is connected to a pin with a pin number of 16 and the line through which an SCL (Serial Clock) signal as a clock signal used for synchronization at the time of transmitting and receiving the SDA signal is transmitted is connected to a pin with a pin number of 15. The DDC 83 (FIG. 6) includes the line through which the SDA signal is transmitted and the line through which the SCL signal is transmitted.

As described above, the line 86 used to detect the connection between the source device and the sink device is connected to a pin with a pin number of 19. As described above, the line 87 used to supply power is connected to a pin with a pin number of 18.

Figure 10:
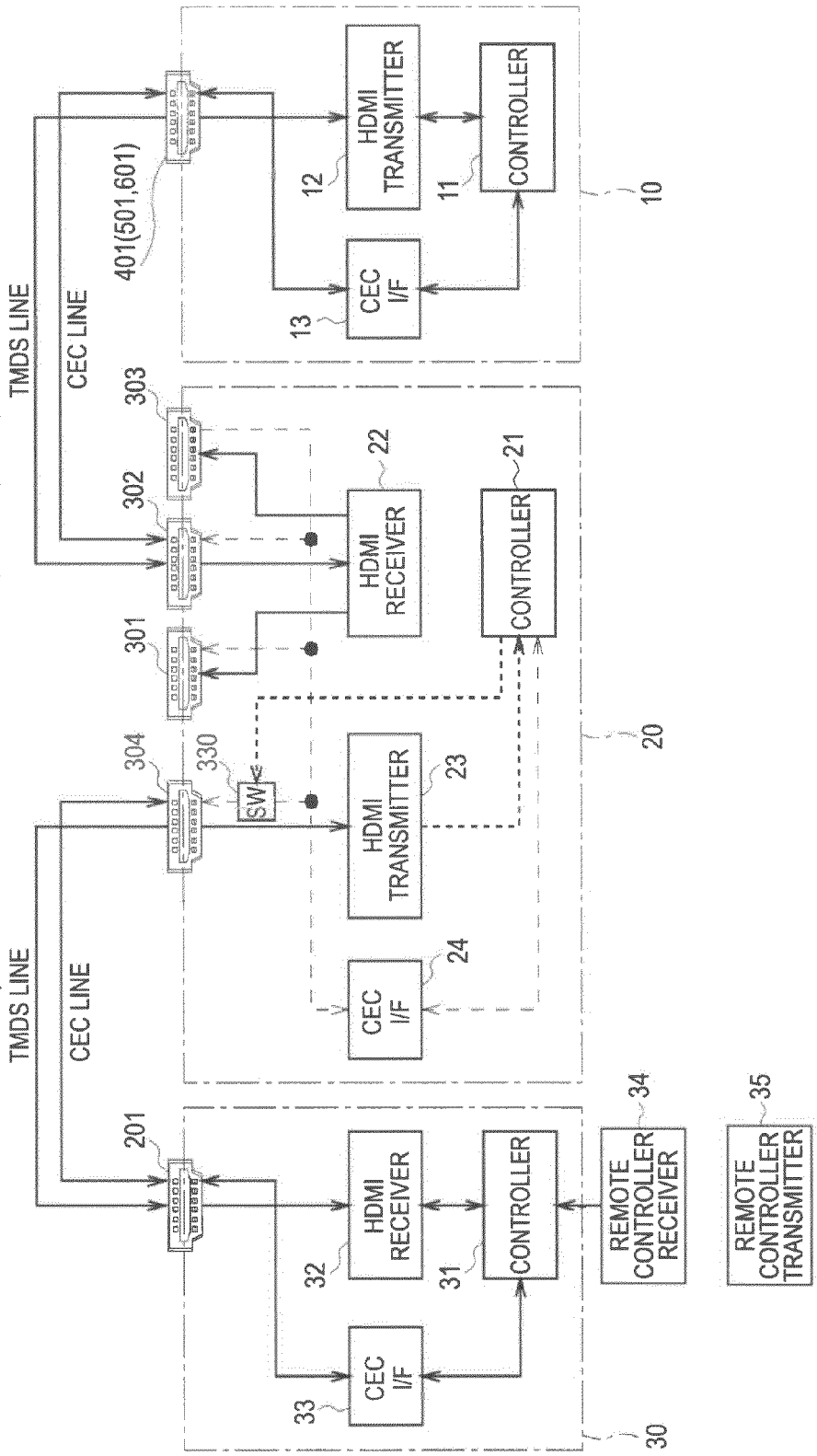
FIG. 10 is a block diagram schematically illustrating the partial configuration associated with HDMI connection when a source device, a repeater device, and a sink device are connected to each other via HDMI cables.

FIG. 10 shows the partial configuration when the source device 10 (the BD recorder 400, the DVD player 500, or the DVD recorder 600), the repeater device 20 (the AV amplifier 300), and the sink device 30 (the television receiver 200) are connected to each other via an HDMI cable.

The HDMI cable includes a TMDS line used to transmit the video data and the audio data in a differential manner and a CEC line which is a bidirectional bus used to transmit control data common (CEC messages) to the devices.

The source device 10 corresponds to, for example, the BD recorder 400, the DVD player 500, the DVD recorder 600 in the AV system 100 (FIG. 1) and includes a controller 11, an HDMI transmitter 12, and a CEC interface 13.

Here, the controller 11 corresponds to, for example, the CPU 421, the flash ROM 422, and the DRAM 423 of the BD recorder 400 (FIG. 4). The HDMI transmitter 12 and the CEC interface 13 correspond to, for example, the HDMI transmission unit 402 of the BD recorder 400 (FIG. 4). The HDMI transmitter 12 and the CEC interface 13 are connected to, for example, the HDMI terminal 401 of the BD recorder 400.

The repeater device 20 corresponds to, for example, the AV amplifier 300 of the AV system 100 (FIG. 1) and includes a controller 21, an HDMI receiver 22, an HDMI transmitter 23, and a CEC interface 24.

Here, the controller 21 corresponds to, for example, the CPU 321, the flash ROM 322, and the CEC interface 24 of the AV amplifier 300 (FIG. 6). The HDMI receiver 22, the HDMI transmitter 23, and the CEC interface 24 correspond to, for example, the HDMI reception unit 307 and the HDMI transmission unit 308 of the AV amplifier 300 (FIG. 6). The HDMI receiver 22 is connected to the HDMI terminals 301, 302, and 303 of the AV amplifier 300 and the HDMI transmitter 23 is connected to the HDMI terminal 304 of the AV amplifier 300.

The switch circuit 330 (see FIG. 5) including a relay and the CEC interface 24 are disposed in the CEC line (thin broken line) connected between the controller 21 and the HDMI terminal 304.

The sink device 30 corresponds to, for example, the television receiver 200 of the AV system 100 (FIG. 1) and includes a controller 31, an HDMI receiver 32, a CEC interface 33, a remote controller receiver 34, and a remote controller transmitter 35. Here, the controller 31 corresponds to, for example, the CPU 231, the flash ROM 232, and the DRAM 233 of the television receiver 200 (FIG. 3).

The HDMI receiver 32 and the CEC interface 33 correspond to, for example, the HDMI reception unit 205 of the television receiver 200 (FIG. 3). The remote controller receiver 34 and the remote controller transmitter 35 correspond to the remote controller receiver 234 and the remote controller transmitter 235 of the television receiver 200 (FIG. 3).

The HDMI transmitter 12 of the source device 10 and the HDMI receiver 22 of the repeater device 20 are connected to each other by a TMDS line via the HDMI terminal 401 of the source device 10 and the HDMI terminal 302 of the repeater device 20.

The HDMI transmitter 23 of the repeater device 20 and the HDMI receiver 32 of the sink device 30 are connected to each other by a TMDS line via the HDMI terminal 304 of the repeater device 20 and the HDMI terminal 201 of the sink device 30.

The CEC interfaces 13, 24, and 33 of the source device 10, the repeater device 20, and the sink device 30 are commonly connected to each other by the CEC line. That is, the source device 10 and the repeater device 20 are connected to each other by connecting the HDMI terminal 401 of the source device 10 and the HDMI terminal 302 of the repeater device 20 by the CEC line, and the repeater device 20 and the sink device 30 are connected to each other by connecting the HDMI terminal 304 of the repeater device 20 and the HDMI terminal 201 of the sink device 30 by the CEC line.

In this way, since the source device 10, the repeater device 20, and the sink device 30 are commonly connected by the CEC line, they are in a mutually controllable state, and the repeater device 20 and the source device 30 can be operated via the CEC line, for example, by the use of the remote controller transmitter 35 of the sink device 30.

Accordingly, the controller 21 of the repeater device 20 can supply a CEC message, which is transmitted from the source device 10 via the HDMI terminal 401, the CEC line, and the HDMI terminal 302, to the sink device 30 via the HDMI terminal 304, the CEC line, and the HDMI terminal 201, or can stop the supply to the sink device 30, by controlling the ON and OFF states of the switch circuit 330.

Figure 11:
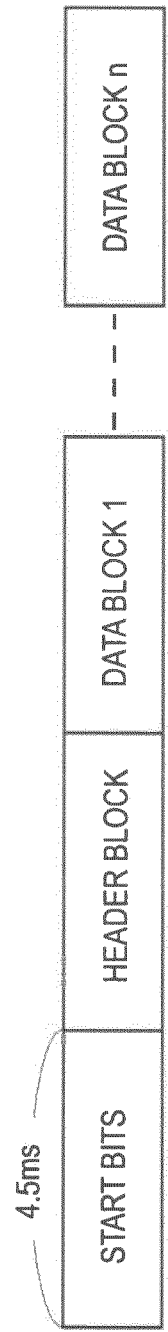
FIG. 11 is a diagram schematically illustrating the data structure of data transmitted via a CEC line.

FIG. 11 shows a block configuration of data transmitted via the CEC line (CEC channel). In the CEC line, one block is transmitted per 4.5 ms. At the time of starting the transmission of data, a start bit is disposed, a header block is disposed subsequent thereto, and a predetermined number of (n) data blocks 1 to n including data to be actually transmitted are disposed subsequent thereto.

Figure 12:
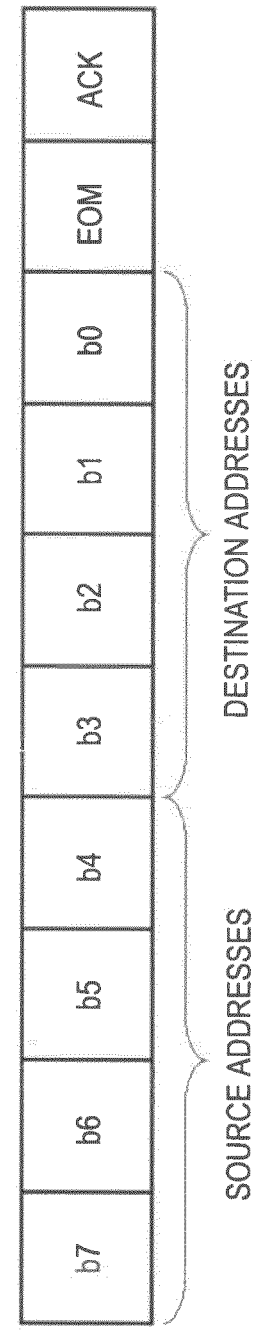
FIG. 12 is a diagram schematically illustrating the data structure of a header block.

FIG. 12 shows a data structure of the header block. The header block has a structure in which a logical address (source address) of a source and a logical address (sink address) of a destination are arranged and an EOM (End of Message) and an ACK (Acknowledgement) are arranged subsequent thereto.

1-7. CEC Line Control in Repeater Device (AV Amplifier)

Figure 13:
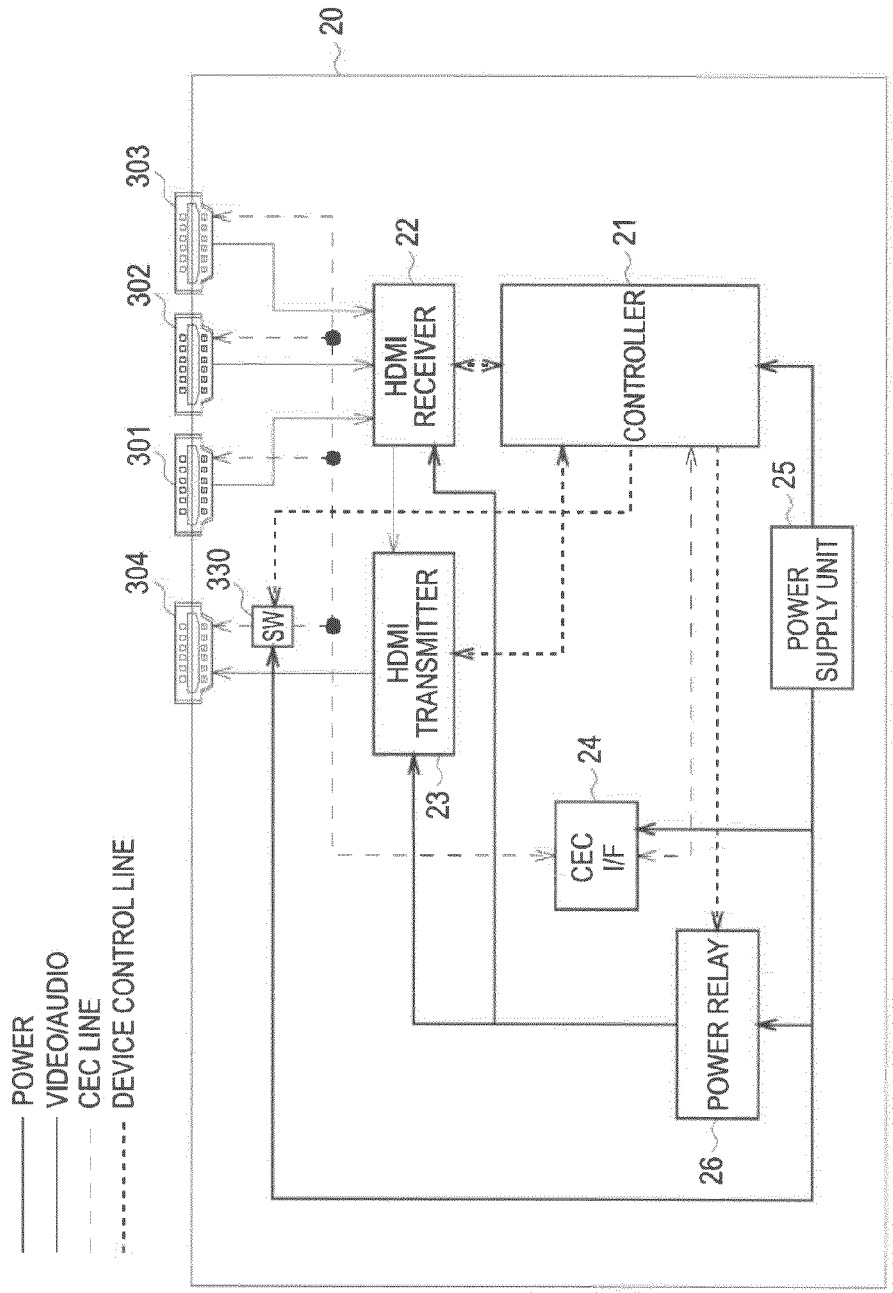
FIG. 13 is a block diagram schematically illustrating a power-on state of a repeater device (AV amplifier).

FIG. 13 of which elements corresponding to those of FIG. 10 are referenced by like reference numerals shows a configuration used to switch the CEC line between the repeater device 20 and the sink device 30 between an activated state and a deactivated state by controlling the ON and OFF of the switch circuit 330 in the repeater device 20 (the AV amplifier 300).

In the repeater device 20, in a power-on state where a power button (not shown) is pressed, power is supplied from the power supply unit 25 to the controller 21, the CEC interface 24, the power relay 26, and the switch circuit 330 and power is supplied to the HDMI receiver 22 and the HDMI transmitter 23 via the power relay 26.

That is, in the power-on state where power is supplied from the power supply unit 25, the controller 21 of the repeater device 20 can control the CEC interface 24, the power relay 26, and the switch circuit 330 and can control the HDMI receiver 22 and the HDMI transmitter 23 supplied with power via the power relay 26.

Figure 14:
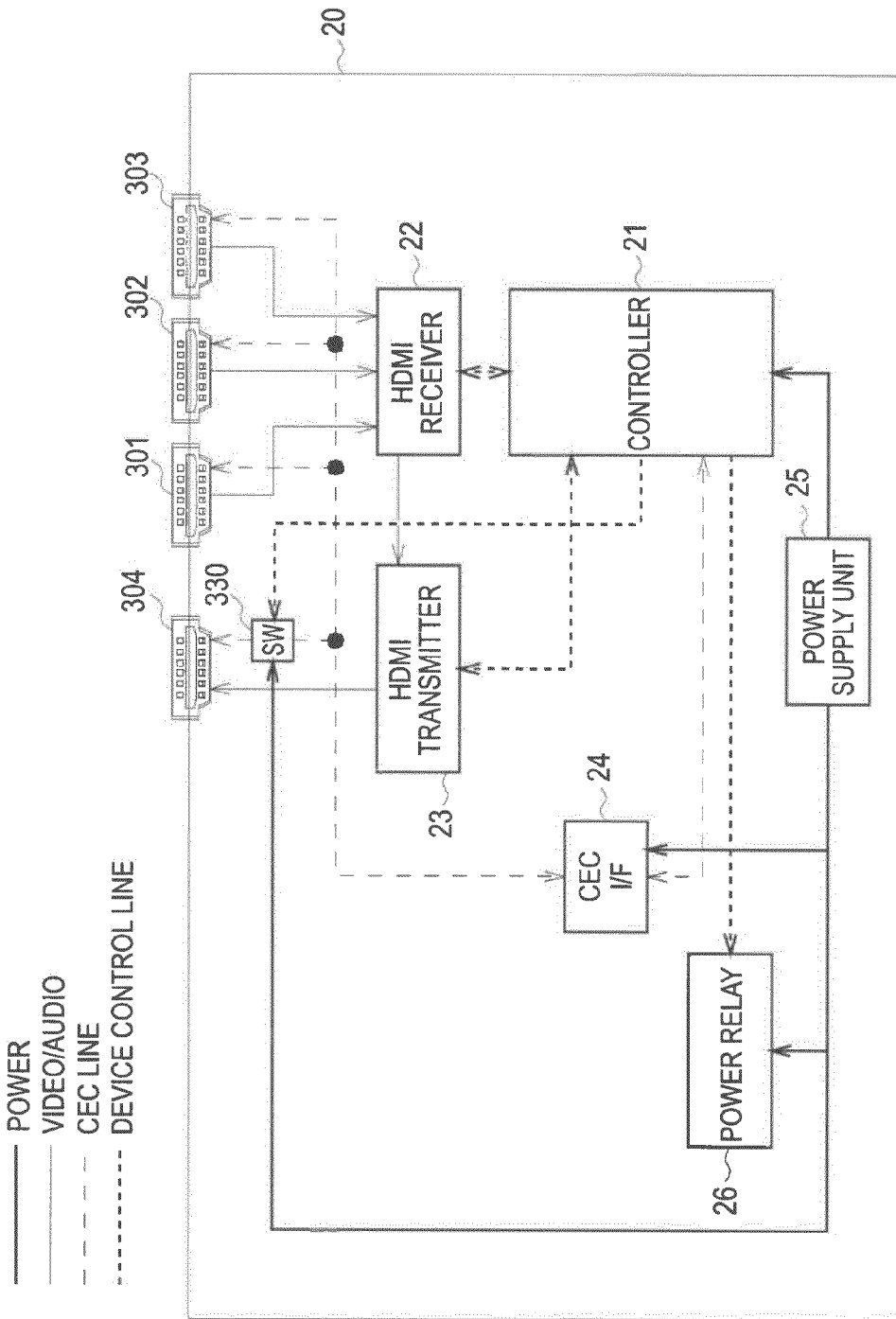
FIG. 14 is a block diagram schematically illustrating a standby state of a repeater device (AV amplifier).

On the contrary, in a standby state where the controller 21 of the repeater device 20 is connected to a commercial power supply via an AC socket but the power button is not pressed as shown in FIG. 14, power is supplied from the power supply unit 25 to the controller 21, the CEC interface 24, the power relay 26, and the switch circuit 330 but the supply of power to the HDMI receiver 22 and the HDMI transmitter 23 via the power relay 26 is stopped.

Accordingly, in the repeater device 20, the HDMI receiver 22 and the HDMI transmitter 23 do not work and the repeater function is stopped, but the power consumption can be reduced.

However, in the repeater device 20, power is supplied to the controller 21 and the switch circuit 330. Accordingly, in the standby state, the switch circuit 330 can be turned on in a CEC combined status to activate the CEC line connecting the HDMI terminal 304 of the repeater device 20 and the HDMI terminal 201 of the sink device 30, or the switch circuit 330 can be turned off in a CEC limited status to deactivate the CEC line.

1-8. CEC Combined Status and CEC Limited Status

The repeater device 20 is switched between the CEC combined status where a CEC combination function is performed between the source device 10 and the sink device 30 by turning on the switch circuit 330 and the CEC limited status where a part of the CEC combination function is limited by turning off the switch circuit 330.

Actually, in the repeater device 20, when the CEC combined status is set by a user through the use of a menu picture displayed on the display panel 216 of the television receiver 200 as the sink device 30, a one-touch play function, an audio rate control function, and a system standby function are all activated and performed. The functions corresponding to the CEC combined status are not limited to these functions.

Here, the one-touch play function is a function of allowing the repeater device 20 and the sink device 30 to automatically perform the input switching corresponding to one of the BD recorder 400, the DVD player 500, and the DVD recorder 600 as the source device 10. The one-touch play function is referred to as a "dynamic function", since it causes a superficial dynamic change which the input switching and can allow a user to visually confirm the superficial dynamic change.

The audio rate control function is a function of excluding the influence of the clock jitter in advance to enhance the audio quality by accomplishing the clock synchronization between the AV amplifier 300 as the repeater device 20 and, for example, the BD recorder 400 as the source device 10. The audio rate control function is expected to enhance the audio quality, but does not cause a superficial dynamic change so as for a user to visually confirm the superficial dynamic change. Accordingly, the audio rate control function is referred to as a "static function".

For example, when the power supply of the television receiver 200 as the sink device 30 is turned off, the system standby function is a function of automatically turning off the power supply of the AV amplifier 300 as the repeater device 20 or the BD recorder 400 or the like as the source device 10 along therewith. The system standby function is referred to as a "dynamic function", since it causes a superficial dynamic change of turning off the power supply and can allow a user to visually confirm the superficial dynamic change.

On the other hand, when the CEC limited status is set by a user through the use of a menu picture displayed on the display panel 216 of the television receiver 200 as the sink device 30, the repeater device 20 is configured to deactivate the one-touch play function and the system standby function as the "dynamic function" in advance, but to exceptionally activate the audio rate control function as the "static function" in advance.

Specifically, when the CEC combined status is set by the user, the AV amplifier 300 as the repeater device 20 in the AV system 100 changes the switch circuit 330 to the ON state and activates the one-touch play function as the "dynamic function", the audio rate control function as the "static function", and the system standby function as the "dynamic function".

On the other hand, in the AV amplifier 300, by setting the CEC limited status as a default at the time of shipment, even when the CEC combined status is not set by the user positively, only at least the audio rate control function as the "static function" is activated from the first time so as to enhance the audio quality in advance.

When the CEC limited status is set at the time of shipment or by the user, the AV amplifier 300 changes the switch circuit 330 to the OFF state to activate only the audio rate control function as the "static function" and to deactivate the one-touch play function and the system standby function as the "dynamic function". Accordingly, it is possible to automatically distinguish and use various functions without urging the user to perform a specific menu operation.

In addition, the AV amplifier 300 can prevent an unnecessary reaction from being performed in advance in the one-touch play function and the system standby function, which are not desired by the user, by deactivating the one-touch play function and the system standby function as the "dynamic function" of causing the superficial change.

Another example of the "static function" in the AV system 100 is an information display function of displaying "broadcasting station name", "artist information", "category information", and the like sent from, for example, a digital satellite tuner on an FL (Fluorescent Lamp) display tube of the AV amplifier 300. The information display function may be activated in advance.

1-9. CEC Line Control Process Using Switch Circuit

The flow of performing the CEC line control process by allowing the repeater device 20 to control the ON and OFF states of the switch circuit 330 will be described in various cases.

Here, as the assumption in the repeater device 20, the switch circuit 330 is set to a line-deactivated state in a power non-supply state where it is not connected to a commercial power supply via an AC socket. That is, a relay which is necessarily set to be line-deactivated in the power non-supply state is used as the switch circuit 330.

In the complete power non-supply state, since the repeater device 20 does not supply power to the controller 21 and the switch circuit 330 from the power supply unit 25, the switch circuit 330 including a relay is necessarily turned off. However, when a relay which is set to a line-activated state is used as the switch circuit 330 at this time, it is possible to prevent the one-touch play function and the system standby function as the "dynamic function" from being activated between the source device 10 and the sink device 30.

The AV amplifier 300 as the repeater device 20 can select the CEC combined status and the CEC limited status through the use of a menu or the like in advance. Accordingly, when any one is selected, the operating mode of the CEC combined status or the CEC limited status is stored in the flash ROM 322.

Accordingly, for example, even when it is in the power non-supply state where it is not connected to the commercial power supply via an AC socket, the AV amplifier 300 as the repeater device 20 can control the operation when power is supplied thereafter, on the basis of the operating mode (the CEC combined status or the CEC limited status) stored in advance in the flash ROM 322.

[1-9-1. Control Sequence when AC-Off State is Changed to Power-on State on the Assumption of CEC Limited Status]

Figure 15:
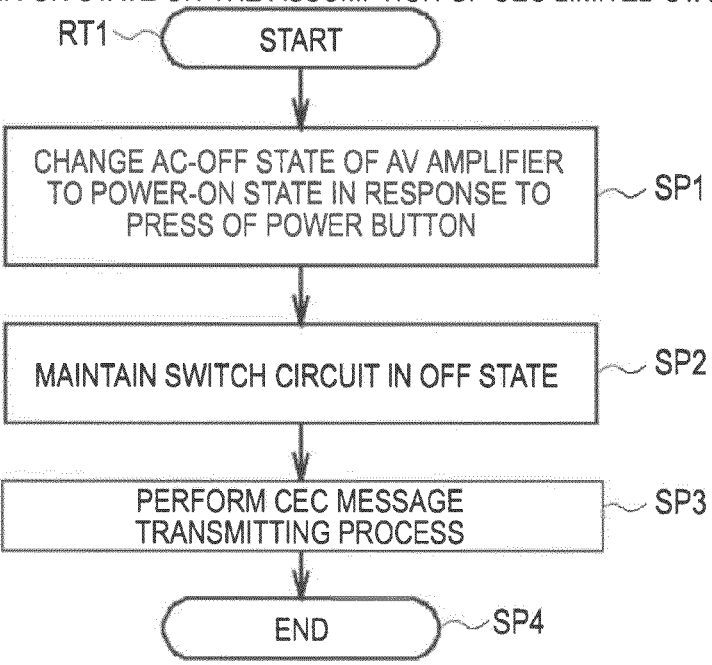
FIG. 15 is a flow diagram schematically illustrating a control sequence when an AC-off state is changed to a power-on state on the assumption of a CEC limited status.

As shown in FIG. 15, the controller 21 (the CPU 321) of the repeater device 20 (the AV amplifier 300) starts the control sequence of routine RT1 and then performs the process of step SP1. When it is recognized in step SP1 that an AC-off state (power non-supply state) where it is not connected to a commercial power supply via an AC socket is changed to a power-on state (power supply state) where it is connected to the AC socket and the power button of the repeater device 20 is pressed, the process of step SP2 is performed.

In step SP2, the controller 21 of the repeater device 20 turns off the switch circuit 330 in the AC-off state. However, since the operating mode stored in advance in the flash ROM 322 is the CEC limited status, the switch circuit 330 is maintained in the OFF state even after the change to the power-on state and then the process of step SP3 is performed.

In step SP3, the controller 21 of the repeater device 20 transmits a polling CEC message in order for the repeater device 20 itself to participate in the CEC communication in the CEC limited status, and then ends the control sequence in step SP4.

In this case, in the AV system 100, since the CEC limited status is set even at the time of the change to the power-on state (power supply state), the switch circuit 330 is maintained in the OFF state and the repeater device 20 and the source device 10 are CEC-connected to each other, but the repeater device 20 and the sink device 30 are not CEC-connected to each other, whereby only the audio rate control function as the "static function" is activated.

[1-9-2. Control Sequence when CEC Limited Status is Changed to CEC Combined Status in Power-on State]

Figure 16:
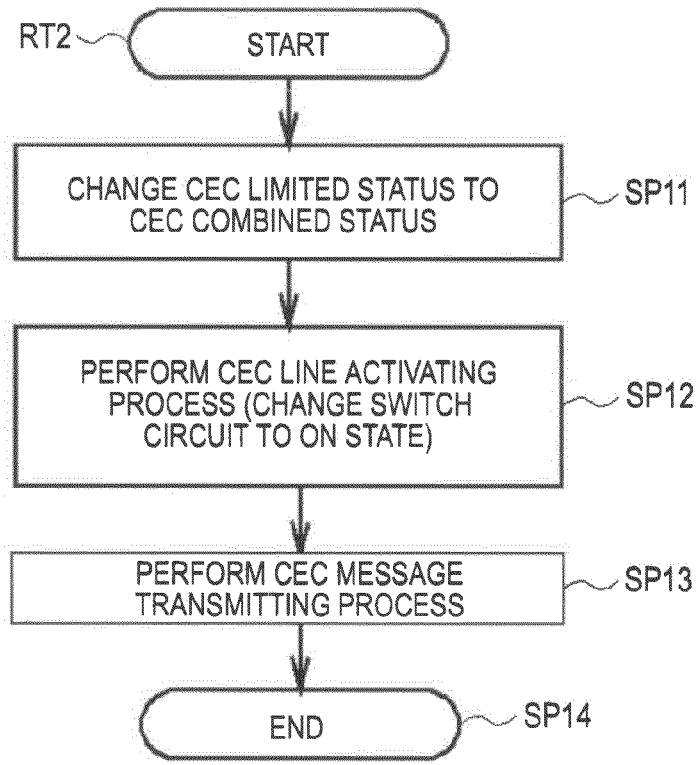
FIG. 16 is a flow diagram schematically illustrating a control sequence when a CEC limited status is switched to a CEC combined status in the power-on state.

The controller 21 (the CPU 321) of the repeater device 20 (the AV amplifier 300) starts the control sequence of routine RT2 shown in FIG. 16 subsequently to the control sequence of routine RT1 (FIG. 15), and then performs the process of step SP11.

In step SP11, the controller 21 of the repeater device 20 performs the process of step SP12 when recognizing that the present CEC limited status is changed to the CEC combined status by means of the user's operation on the menu in the power-on state.

In step SP12, for the purpose of the change to the CEC combined status, the controller 21 of the repeater device 20 performs a CEC line activating process, that is, turns on the switch circuit 330, and then performs the process of step SP13.

In step SP13, since the CEC limited status is changed to the CEC combined status, the controller 21 of the repeater device 20 transmits a CEC message representing the change in status, and then ends the control sequence in step SP14.

In this case, in the AV system 100, since the CEC limited status is changed to the CEC combined status, the switch circuit 330 is completely changed from the OFF state to the ON state, the repeater device 20, the source device 10, and the sink device 30 are all CEC connected to each other, and thus the one-touch play function and the system standby function as the "dynamic function" in addition to the audio rate control function as the "static function" are activated.

[1-9-3. Control Sequence when Standby State is Changed to Power-on State on the Assumption of CEC Limited Status]

As shown in FIG. 17, the controller 21 (the CPU 321) of the repeater device 20 (the AV amplifier 300) starts the control sequence of routine RT3 and then performs the process of step SP21. When it is recognized in step SP21 that a standby state where it is connected to the commercial power supply via the AC socket but the power button of the repeater device 20 is not pressed is changed to the power-on state (power supply state) where the power button is pressed, the process of step SP22 is performed.

In step SP22, since it is in the standby state but the CEC limited status is assumed, the controller 21 of the repeater device 20 turns off the switch circuit 330. However, since the CEC limited status is set even after the change to the power-on state, the switch circuit 330 is maintained in the OFF state and then the process of step SP23 is performed.

In step SP23, the controller 21 of the repeater device 20 transmits the polling CEC message in order for the repeater device 20 itself to participate in the CEC communication in the CEC limited status, and then ends the control sequence in step SP24.

In this case, in the AV system 100, since the CEC limited status is set even at the time of the change from the standby state to the power-on state (power supply state), the switch circuit 330 is maintained in the OFF state and the repeater device 20 and the source device 10 are CEC-connected to each other, but the repeater device 20 and the sink device 30 are not CEC-connected to each other, whereby only the audio rate control function as the "static function" is activated.

Thereafter, in order to change the CEC limited status to the CEC combined status in the power-on state, the repeater device 20 can perform the control sequence on the basis of "1-9-3. Control Sequence when Standby State is Changed to Power-on State on the Assumption of CEC Limited Status".

[1-9-4. Control Sequence when Standby State is Changed to Power-on State on the Assumption of CEC Combined Status]

As shown in FIG. 18, the controller 21 (the CPU 321) of the repeater device 20 (the AV amplifier 300) starts the control sequence of routine RT4 and then performs the process of step SP31. When it is recognized in step SP31 that the standby state where it is connected to the commercial power supply via the AC socket but the power button of the repeater device 20 is not pressed is changed to the power-on state (power supply state), the process of step SP32 is performed.

In step SP32, since it is in the standby state but the operating mode stored in advance in the flash ROM 322 is the CEC combined status, the controller 21 of the repeater device 20 turns on the switch circuit 330. Accordingly, since the CEC combined status is set even after the change to the power-on state, the switch circuit 330 is maintained in the ON state and then the process of step SP33 is performed.

In step SP33, the controller 21 of the repeater device 20 transmits the CEC message representing the CEC combined status, and then ends the control sequence in step SP34.

In this case, in the AV system 100, since the standby state is changed to the power-on state on the assumption of the CEC combined status, the switch circuit 330 is maintained in the ON state and the repeater device 20, the source device 10, and the sink device 30 are all CEC-connected to each other, whereby the audio rate control function as the "static function" and the one-touch play function and the system standby function as the "dynamic function" are all activated.

[1-9-5. Control Sequence when CEC Combined Status is Changed to CEC Limited Status in Power-on State]

Figure 19:
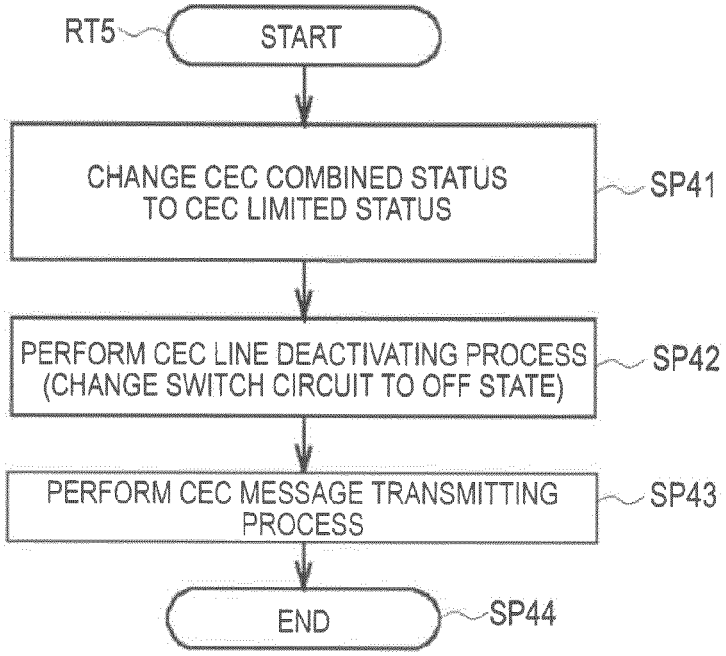
FIG. 19 is a flow diagram schematically illustrating a control sequence when the CEC combined status is switched to the CEC limited status in the power-on state.

The controller 21 (the CPU 321) of the repeater device 20 (the AV amplifier 300) starts the control sequence of routine RT5 shown in FIG. 19 subsequently to the control sequence of routine RT4 (FIG. 18), and then performs the process of step SP41.

In step SP41, the controller 21 of the repeater device 20 performs the process of step SP42 when recognizing that the present CEC combined status is changed to the CEC limited status by means of the user's operation on the menu in the power-on state.

In step SP42, for the purpose of the change from the CEC combined status to the CEC limited status, the controller 21 of the repeater device 20 performs a CEC line deactivating process, that is, turns off the switch circuit 330, and then performs the process of step SP43.

In step SP43, since the CEC combined status is changed to the CEC limited status, the controller 21 of the repeater device 20 transmits a CEC message representing the change in status, and then ends the control sequence in step SP44.

In this case, in the AV system 100, since the CEC combined status is changed to the CEC limited status, the switch circuit 330 is completely changed from the ON state to the OFF state, the CEC connection between the repeater device 20 and the source device 10 is maintained, but the CEC connection between the repeater device 20 and the sink device 30 is deactivated, whereby only the audio rate control function as the "static function" is activated.

[1-9-6. Control Sequence when AC-off State is Changed to Power-on State on the Assumption of CEC Combined Status]

Figure 20:
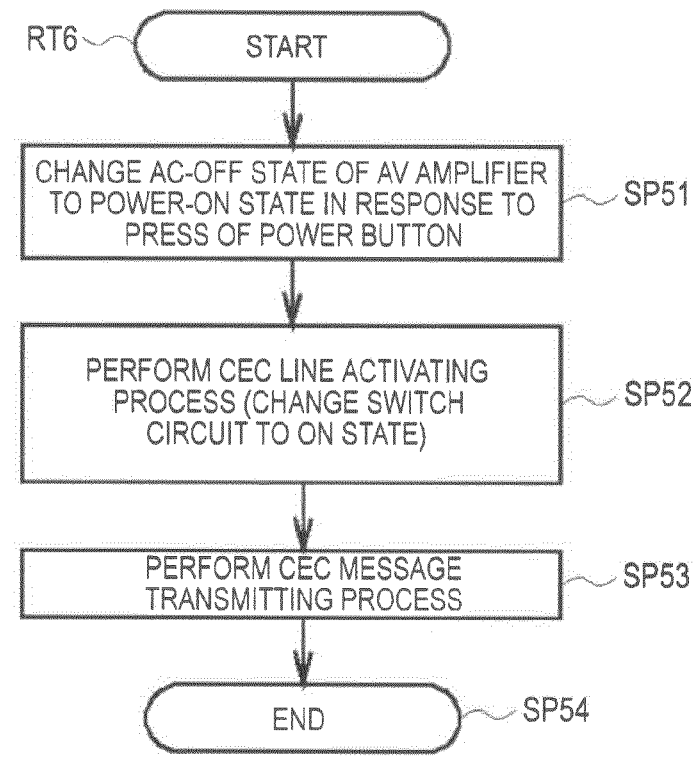
FIG. 20 is a flow diagram schematically illustrating a control sequence when the AC-off state is changed to the power-on state on the assumption of the CEC combined status.

As shown in FIG. 20, the controller 21 (the CPU 321) of the repeater device 20 (the AV amplifier 300) starts the control sequence of routine RT6 and then performs the process of step SP51. When it is recognized in step SP51 that the AC-off state (power non-supply state) where it is not connected to the commercial power supply via the AC socket is changed to the power-on state (power supply state) where it is connected to the AC socket and the power button of the repeater device 20 is pressed, the process of step SP52 is performed.

In step SP52, the controller 21 of the repeater device 20 turns off the switch circuit 330 in the AC-off state. However, since the operating mode stored in advance in the flash ROM 322 is the CEC combined status, the CEC line activating process is performed by turning on the switch circuit 330 at the time of change to the power-on state and then the process of step SP53 is performed.

In step SP53, since the CEC limited status is changed to the CEC combined status, the controller 21 of the repeater device 20 transmits the CEC message representing the change in status, and then ends the control sequence in step SP54.

In this case, in the AV system 100, since the CEC combined status is set at the time of the change to the power-on state (power supply state), the switch circuit 330 is changed from the OFF state to the ON state and the repeater device 20, the source device 10, and the sink device 30 are all CEC-connected to each other, whereby the audio rate control function as the "static function" and the one-touch play function and the system standby function as the "dynamic function" are all activated.

[1-9-7. Control Sequence when Power-on State is Changed to Standby State on the Assumption of CEC Limited Status]

As shown in FIG. 21, the controller 21 (the CPU 321) of the repeater device 20 (the AV amplifier 300) starts the control sequence of routine RT7 and then performs the process of step SP61. When it is recognized in step SP61 that the power-on state (power supply state) where it is connected to the AC socket and the power button of the repeater device 20 is pressed is changed to the standby state, the process of step SP62 is performed.

In step SP62, since it is in the power-on state but the CEC limited status is set, the controller 21 of the repeater device 20 turns off the switch circuit 330. However, even after the change to the standby state, the switch circuit 330 is maintained in the OFF state and then the process of step SP63 is performed.

In step SP63, since the repeater device 20 itself enters the standby state, the controller 21 of the repeater device 20 transmits the CEC message representing the end of the CEC communication, and then ends the control sequence in step SP64.

In this case, in the AV system 100, since the CEC limited status is set at the time of the change from the power-on state (power supply state) to the standby state, the switch circuit 330 is maintained in the OFF state and the CEC connection between the repeater device 20 and the source device 10 is maintained, but the CEC connection between the repeater device 20 and the sink device 30 is deactivated, whereby only the audio rate control function as the "static function" is activated.

[1-9-8. Control Sequence when Power-on State is Changed to Standby State on the Assumption of CEC Combined Status]

As shown in FIG. 22, the controller 21 (the CPU 321) of the repeater device 20 (the AV amplifier 300) starts the control sequence of routine RT8 and then performs the process of step SP71. When it is recognized in step SP71 that the power-on state (power supply state) where it is connected to the AC socket and the power button of the repeater device 20 is pressed is changed to the standby state, the process of step SP72 is performed.

In step SP72, since it is in the power-on state and the CEC combined status is set, the controller 21 of the repeater device 20 turns on the switch circuit 330. However, even after the change to the standby state, the switch circuit 330 is maintained in the ON state and then the process of step SP73 is performed.

In step SP73, since the repeater device 20 itself enters the standby state, the controller 21 of the repeater device 20 transmits the CEC message representing the end of the CEC communication, and then ends the control sequence in step SP74.

In this case, in the AV system 100, since the CEC combined status is set at the time of the change from the power-on state (power supply state) to the standby state, the switch circuit 330 is maintained in the ON state and the CEC connection between the repeater device 20, the source device 10, and the sink device 30 is maintained, whereby the audio rate control function as the "static function" and the one-touch play function and the system standby function s the "dynamic function" are all activated.

[1-9-9. Control Sequence when Power-on State is Changed to AC-off State on the Assumption of CEC Limited Status]

As shown in FIG. 23, the controller 21 (the CPU 321) of the repeater device 20 (the AV amplifier 300) starts the control sequence of routine RT9 and then performs the process of step SP81. When it is recognized in step SP81 that the power-on state (power supply state) where it is connected to the AC socket and the power button of the repeater device 20 is pressed is changed to the AC-off state (power non-supply state) where it is not connected to the commercial power supply via the AC socket, the process of step SP82 is performed.

In step SP82, since it is in the power-on state but the CEC limited status is set, the controller 21 of the repeater device 20 turns off the switch circuit 330. However, even after the change to the AC-off state, the switch circuit 330 is maintained in the OFF state and then the process of step SP83 is performed.

In step SP83, since the repeater device 20 itself enters the AC-off state, the controller 21 of the repeater device 20 does not perform the CEC message transmitting process, but ends the control sequence in step SP84.

In this case, in the AV system 100, since the CEC limited status is set at the time of the change from the power-on state (power supply state) to the AC-off state, the switch circuit 330 is maintained in the OFF state and only the CEC connection between the repeater device 20 and the source device 10 is maintained, whereby only the audio rate control function as the "static function" is activated.

Thereafter, in order to change the AC-off state to the power-on state on the assumption of the CEC limited status, the AV system 100 can perform the control sequence on the basis of "1-9-1. Control Sequence When AC-off State is Changed to Power-on State on the Assumption of CEC Limited Status".

[1-9-10. Control Sequence when Power-on State is Changed to AC-off State on the Assumption of CEC Combined Status]

As shown in FIG. 24, the controller 21 (the CPU 321) of the repeater device 20 (the AV amplifier 300) starts the control sequence of routine RT10 and then performs the process of step SP91. When it is recognized in step SP91 that the power-on state (power supply state) where it is connected to the AC socket and the power button of the repeater device 20 is pressed is changed to the AC-off state (power non-supply state) where it is not connected to the commercial power supply via the AC socket, the process of step SP92 is performed.

In step SP92, since the supply of power to the switch circuit 330 is stopped at the time of change to the AC-off state in the CEC combined status, the controller 21 of the repeater device 20 turns off the switch circuit 330 to deactivate the CEC line and then performs the process of step SP93.

In step SP93, since the repeater device 20 itself enters the AC-off state, the controller 21 of the repeater device 20 does not perform the CEC message transmitting process, but ends the control sequence in step SP94.

In this case, in the AV system 100, since the CEC combined status is set at the time of the change from the power-on state (power supply state) to the AC-off state, the switch circuit 330 is changed from the ON state to the OFF state to deactivate the CEC line, whereby only the CEC connection between the repeater device 20 and the source device 10 is activated.

Thereafter, in order to change the AC-off state to the power-on state on the assumption of the CEC combined status, the AV system 100 can perform the control sequence on the basis of "1-9-6. Control Sequence When AC-off State is Changed to Power-on State on the Assumption of CEC Combined Status".

1-10. Operation and Advantages

In the past state where the source device 10 and the sink device 30 are CEC-connected to the repeater device 20, when a CEC message representing the reproduction is simultaneously transmitted from the source device 10, the repeater device 20 and the sink device 30 simultaneously receive and analyze the CEC message.

At this time, when the source device 10 performs the reproduction as the analysis of the CEC message, the repeater device 20 is automatically switched to the optimal input. However, even if such a dynamic reaction is suppressed, the sink device 30 simultaneously receives the CEC message from the source device 10 and thus its input is automatically switched to correspond to the source device 10.

Therefore, in the repeater device 20 (FIG. 10) according to this embodiment, the switch circuit 330 including a relay is disposed in the CEC line between the HDMI transmitter 23 and the HDMI terminal 304 and the ON and OFF states of the switch circuit 330 are controlled by the controller 21.

Accordingly, when the repeater device 20 turns off the switch circuit 330, the CEC line between the repeater device 20 and the sink device 30 is deactivated but the CEC message communication between the repeater device 20 and the source device 10 can be controlled, thereby suppressing the unnecessary reaction of the sink device 30.

At this time, when the relay is used as the switch circuit 330 and power is not supplied to the switch circuit 330 or the repeater device 20, the line-activated state or the line-deactivated state in the power non-supply state is determined depending on the type of the relay (there are two types of relays of a relay set to a line-activated state in the power non-supply state and a relay set to a line-deactivated state in the power non-supply state) used as the switch circuit 330.

When power is not supplied to the repeater device 20 and the relay is set to the line-activated state among two options, the sink device 30 reacts to the CEC message from the source device 10 and works. Accordingly, even when power is not supplied, a relay necessarily deactivating the CEC line is selected as the relay.

On the contrary, when it is intended to activate the CEC combination function between the repeater device 20 and the sink device 30 but no power is supplied to the switch circuit 330, the CEC message from the source device 10 is not transmitted to the sink device 30, which causes a problem.

Therefore, when the setting is changed to activate the CEC combination function between the repeater device 20 and the sink device 30 and the repeater device 20 is in the standby state, the repeater device 20 can locally supply power to the controller 21 and the switch circuit 330 including the relay so as to control the ON and OFF states of the switch circuit 330.

Accordingly, even in the standby state, the repeater device 20 can control the ON and OFF states of the switch circuit 330. Accordingly, when the operating mode of the CEC combined state is assumed, it is possible to set the switch circuit 330 to the ON state.

Accordingly, the repeater device 20 can activate the combination function with respect to the source device 10 or the sink device 30 connected thereto in a combinable state without any inconvenience to the user, only by allowing the user to select one of the CEC limited status and the CEC combined status through the use of a menu or the like.

Actually, in the repeater device 20, the controller 21 maintains the switch circuit 330 in the OFF state, even in the standby state or the power-on state as well as in the AC-off state, at the time of shipment or when the user selects the CEC limited status in advance.

Since the repeater device 20 turns off the switch circuit 330, the CEC line between the repeater device 20 and the source device 10 is activated and the CEC line between the repeater device 20 and the sink device 30 is deactivated, whereby only the audio rate control function as the "static function" is activated.

Accordingly, since the source device 10 performs the reproduction but the CEC line between the repeater device 20 and the sink device 30 is deactivated, the CEC message from the repeater device 20 is not transmitted to the sink device 30, thereby satisfactorily preventing the sink device 30 from performing a reaction.

On the other hand, by activating the audio rate control function as the "static function" between the repeater device 20 and the source device 10, it is possible to enhance the audio quality of the reproduced audio, thereby outputting a high-quality audio from the speaker group 350 connected to the AV amplifier 300 as the repeater device 20.

When the CEC combined status is selected in advance by a user, the switch circuit 330 of the repeater device 20 is turned off in the AC-off state. However, when it is changed to the standby state or the power-on state, the controller 21 switches the switch circuit 330 from the OFF state to the on state.

Accordingly, in the repeater device 20, when the CEC combined status is selected, the CEC lines between the repeater device 20, the source device 10, and the sink device 30 are all activated. Accordingly, the one-touch play function and the system standby function as the "dynamic function" as well as the audio rate control function as the "static function" can be activated.

According to the above-mentioned configuration, when the operating mode of the CEC limited status is selected, the CEC line to the sink device 30 is deactivated by the use of the switch circuit 330 and only the "static function" can be activated. Accordingly, the "dynamic function" is not activated and thus the combination function between the devices connected in a combinable state can be activated without any inconvenience to a user.

2. Other Embodiments

In the above-mentioned embodiment, it has been described that when the operating mode of the CEC limited state is selected, only the "static function" is activated. However, the present disclosure is not limited to this configuration, but even when the operating mode of the CEC limited status is selected, only a part of the "dynamic function" may be activated by a user's setting.

In the above-mentioned embodiment, it has been described that the BD recorder 400, the DVD player 500, and the DVD recorder 600 as the source device 10, the AV amplifier 300 as the repeater device 20, and the television receiver 200 as the sink device 30 are independently disposed. However, the present disclosure is not limited to this configuration, but, for example, the AV amplifier 300 may be built in the BD recorder 400 or the AV amplifier 300 may be built in the television receiver 200.

In the above-mentioned embodiments, it has been described that the AV amplifier 300 is used as the repeater device 20. However, the present disclosure is not limited to this configuration, but an electronic device such as a personal computer other than the AV amplifier 300 may be used as long as they are devices having a repeater function.

In the above-mentioned embodiments, it has been described that the BD recorder 400, the DVD player 500, and DVD recorder 600 are used as the source device 10. However, the present disclosure is not limited to this configuration, but a digital video camera, a digital camera, a personal computer, a mobile phone, a game machine, and the like may be used as long as they are electronic apparatuses which can be HDMI-connected.

In the above-mentioned embodiments, it has been described that the television receiver 200 is used as the sink device 30. However, the present disclosure is not limited to this configuration, but a personal computer, a mobile phone, a game machine, and the like may be used as long as they are electronic apparatuses which can be HDMI-connected.

The present disclosure contains subject matter related to that disclosed in Japanese Priority Patent Application JP 2010-166325 filed in the Japan Patent Office on Jul. 23, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A repeater device comprising:
a plurality of input terminals operable to receive transmission data and Consumer Electronics Control (CEC) messages from a source device connected to the repeater device;
an output terminal operable to output the CEC messages received from the source device to a sink device connected to the repeater device;
a controller; and
a switch circuit disposed in a CEC line connected between the controller and the output terminal, wherein the controller is operable to:
control the switch circuit to switch to an activated state or a deactivated state; and
deactivate the CEC line connected between the controller and the output terminal and stop the output of the received CEC messages from the repeater device to the sink device when the switch circuit is in the deactivated state.

2. The repeater device according to claim 1, wherein the controller is operable to:
selectively switch the repeater device to a first state and a second state when the source device and the sink device are connected to each other in a controllable state;
set an operating mode of the repeater device to the first state by switching the switch circuit to the deactivated state, wherein in the first state a dynamic function of the repeater device is deactivated and a static function of the repeater device is activated; and
set the operating mode of the repeater device to the second state by switching the switch circuit to the activated state, wherein in the second state the dynamic function and the static function are both activated.

3. The repeater device according to claim 2, wherein the controller and the switch circuit are supplied with power in a standby state of the repeater device, wherein in the standby state the controller controls the switch circuit to deactivate the CEO line when the first state is selected, and the controller controls the switch circuit to activate the CEO line when the second state is selected.

4. The repeater device according to claim 2, wherein the controller is operable to control the switch circuit to activate the CEO line and activate the dynamic function and the static function when the second state is selected.

5. The repeater device according to claim 2, wherein the controller is operable to recognize that the operating mode of the first state is set by reading information which indicates that the operating mode of the first state is set and which is stored in a predetermined storage medium at time of shipment of the repeater device.

6. A control method in a repeater device, comprising:
receiving transmission data and Consumer Electronics Control (CEO) messages via a plurality of input terminals, wherein the transmission data and the CEO messages are supplied from a source device connected to the repeater device;
outputting, via an output terminal, the CEO messages received from the source device to a sink device connected to the repeater device; and
controlling ON and OFF states of a switch circuit disposed in a CEO line connected between a controller and the output terminal,
wherein when the switch circuit is in the OFF state, the CEO line connected between the controller and the output terminal is deactivated and the transmission of the CEO messages from the repeater device to the sink device is stopped.

7. The method according to claim 6, further comprising:
setting an operating mode of the repeater device to a first state by switching the switch circuit to the OFF state, wherein in the first state a dynamic function of the repeater device is deactivated and a static function of the repeater device is activated;
wherein the repeater device is set to the first state in response to a user's predetermined operation when the source device and the sink device are connected to each other in a controllable state.

8. The method according to claim 7, wherein the first state is a limited state.

9. The method according to claim 7, wherein the dynamic function is associated with causing a superficial dynamic change and allowing the user to visually confirm the superficial dynamic change.

10. The method according to claim 7, wherein the static function is associated with not causing a superficial dynamic change.

11. The method according to claim 7, further comprising:
setting the operating mode of the repeater device to a second state where the dynamic function and the static function are both activated in response to said user's predetermined operation; and
selectively switching the repeater device to the first state and the second state when the source device and the sink device are connected to each other in said controllable state.

12. The method according to claim 11, wherein the first state is a CEO limited state and the second state is a CEO combined state.

13. The repeater device according to claim 1, wherein a dynamic function of the repeater device is associated with causing a superficial dynamic change and allowing a user to visually confirm the superficial dynamic change.

14. The repeater device according to claim 1, wherein a static function of the repeater device is associated with not causing a superficial dynamic change.

15. The repeater device according to claim 1, wherein the controller is operable to rectify clock jitter in the transmission data.

16. The repeater device according to claim 1, wherein the controller is operable to amplify audio data of the transmission data.

17. The repeater device according to claim 1, wherein the controller automatically connects the source device to the sink device on basis of analysis of the received CEO messages.

18. The repeater device according to claim 1, wherein the repeater device comprises one of: an AV amplifier and/or a personal computer.

19. The repeater device according to claim 1, wherein the source device comprises one of: a Blue-Ray Disc (BD) recorder, the DVD player, and/or a DVD recorder.

20. The repeater device according to claim 1, wherein the sink device comprises one or more of: a television receiver, a speaker group, a personal computer, a mobile phone, and/or a game machine.

21. The repeater device according to claim 1, wherein the controller is operable to:
determine a set operating mode of the repeater device when the repeater device enters from a AC-off state to a power-on state; and
control the switch circuit to switch to the activated state or the deactivated state based on the determined set operating mode.

22. The repeater device according to claim 1, wherein the controller is operable to:
determine a set operating mode of the repeater device when the repeater device enters from a standby state to a power-on state; and
control the switch circuit to switch to the activated state or the deactivated state based on the determined set operating mode, wherein in the standby state power is supplied to the controller and the switch circuit, and a power supply to a High Definition Multimedia Interface (HDMI) transmitting unit and a HDMI receiving unit of the repeater device is stopped,
wherein in the power-on state power is supplied to the controller, the switch circuit, the HDMI transmitting unit, and the HDMI receiving unit.

23. The repeater device according to claim 1, wherein the controller is operable to:
determine a set operating mode of the repeater device when the repeater device enters from a power-on state to a standby state; and
control the switch circuit to switch to the activated state or the deactivated state based on the determined set operating mode,
wherein in the standby state power is supplied to the controller and the switch circuit, and a power supply to a High Definition Multimedia Interface (HDMI) transmitting unit and a HDMI receiving unit of the repeater device is stopped,
wherein in the power-on state power is supplied to the controller, the switch circuit, the HDMI transmitting unit, and the HDMI receiving unit.

* * * * *